US012565620B2

(12) United States Patent

Fathi et al.

(10) Patent No.: US 12,565,620 B2
(45) Date of Patent: Mar. 3, 2026

(54) SYSTEMS AND PROCESSES FOR HYDROCARBON UPGRADING USING CATALYSTS

(71) Applicant: Saudi Arabian Oil Company, Dhahran (SA)

(72) Inventors: Mazin M. Fathi, Dammam (SA); Mohammed R. Aldossary, Dhahran (SA); Bader M. Otaibi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 177 days.

(21) Appl. No.: 18/450,047

(22) Filed: Aug. 15, 2023

(65) Prior Publication Data

US 2025/0059450 A1 Feb. 20, 2025

(51) Int. Cl.
| | |
|---|---|
| *C10G 11/20* | (2006.01) |
| *B01J 23/44* | (2006.01) |
| *B01J 23/86* | (2006.01) |
| *B01J 23/882* | (2006.01) |
| *B01J 23/89* | (2006.01) |
| *B01J 35/00* | (2024.01) |
| *B01J 35/30* | (2024.01) |
| *C10G 11/02* | (2006.01) |

(52) U.S. Cl.
CPC .............. *C10G 11/20* (2013.01); *B01J 23/44* (2013.01); *B01J 23/862* (2013.01); *B01J 23/882* (2013.01); *B01J 23/892* (2013.01); *B01J 35/00* (2013.01); *B01J 35/30* (2024.01); *C10G 11/02* (2013.01); *C10G 2300/4006* (2013.01); *C10G 2300/4012* (2013.01)

(58) Field of Classification Search
CPC .............................. C10G 11/20; C10G 11/02; C10G 2300/4006; C10G 2300/4012; C10G 2300/805; C10G 31/08; B01J 23/44; B01J 23/862; B01J 23/882; B01J 23/892; B01J 35/00; B01J 35/30
See application file for complete search history.

(56) References Cited

U.S. PATENT DOCUMENTS

| | | | |
|---|---|---|---|
| 4,110,192 | A | 8/1978 | Hildebrand et al. |
| 4,127,393 | A | 11/1978 | Timmins et al. |
| 4,128,471 | A | 12/1978 | Malone et al. |

(Continued)

OTHER PUBLICATIONS

Batsanov, "Van der Waals Radii of Elements", Inorganic Materials, vol. 37, No. 9, pp. 871-885, 2001.

(Continued)

*Primary Examiner* — Prem C Singh
*Assistant Examiner* — Juan C Valencia
(74) *Attorney, Agent, or Firm* — DINSMORE & SHOHL LLP

(57) ABSTRACT

A process for upgrading a hydrocarbon-based composition includes combining a heated water stream and a pressurized, heated hydrocarbon-based composition in a mixing device to create a combined feed stream. The combined feed stream is introduced into a supercritical water reactor operating at a temperature greater than a critical temperature of water and a pressure greater than a critical pressure of water. The combined feed stream is at least partially converted to an upgraded product. At least one catalyst lobular structure is present in the supercritical water reactor.

20 Claims, 5 Drawing Sheets

(56) References Cited

U.S. PATENT DOCUMENTS

| | | | | |
|---|---|---|---|---|
| 4,209,305 | A | 6/1980 | Conway et al. | |
| 4,214,977 | A | 7/1980 | Ranganathan et al. | |
| 9,295,957 | B2 * | 3/2016 | Choi | C10G 75/00 |
| 11,466,221 | B2 | 10/2022 | Fathi et al. | |
| 2012/0181217 | A1 | 7/2012 | Choi et al. | |
| 2017/0166822 | A1 * | 6/2017 | Choi | C10G 75/04 |
| 2018/0187093 | A1 | 7/2018 | Choi et al. | |
| 2021/0403817 | A1 * | 12/2021 | Fathi | C10G 47/02 |
| 2022/0213393 | A1 * | 7/2022 | Fathi | C10G 49/18 |

OTHER PUBLICATIONS

Gray et al., "Abstraction of hydrogen from hydrogen sulfide by methyl radicals", Canadian Journal of Chemistry, vol. 47, pp. 689-690, 1969.
Koseoglu et al., "Hydrocracking of Athabasca bitumen", Fuel, vol. 67, pp. 552-556, Apr. 1988.
Koseoglu et al., "Kinetic models for the non-catalytic hydrocracking of Athabasca bitumen", Fuel, vol. 67, pp. 906-915, Jul. 1988.
Timko et al., "Upgrading and desulfurization of heavy oils by supercritical water", The Journal of Supercritical Fluids 96, pp. 114-123, Jan. 2015.

* cited by examiner

SYSTEMS AND PROCESSES FOR HYDROCARBON UPGRADING USING CATALYSTS

TECHNICAL FIELD

Embodiments of the present disclosure generally relate to upgrading petroleum-based compositions, and more specifically relate to catalytic supercritical reactor systems, methods, and uses for upgrading petroleum-based compositions.

BACKGROUND

Petroleum is an indispensable source of energy; however, most petroleum is heavy or sour petroleum, meaning that it contains a high amount of impurities (including sulfur and coke, a high carbon petroleum residue). Heavy petroleum must be upgraded before it is a commercially valuable product, such as fuel. Supercritical water has been known to be an effective reaction medium for heavy oil upgrading without an external supply of hydrogen, at least because supercritical water upgrading reactions are highly selective towards breaking of heavy fractions to produce middle distillate oils without coke generation.

SUMMARY

Although supercritical water has been known to be an effective reaction medium for heavy oil upgrading without an external supply of hydrogen, the upgraded product from a supercritical water process has a greater aromaticity and olefinicity than the hydrocarbon feed, which has negative effect on the stability of the products. Nuclear magnetic resonance (NMR) analysis has shown that the asphaltene content of supercritical water treated oil decreased to a large extent, while saturate, olefin, and aromatic content increased. Additionally, the extent of hydrocarbon upgrading in conventional supercritical water upgrading processes may be limited. The high temperature of supercritical water reactor induces thermal cracking of chemical bonds such as carbon-sulfur bonds and carbon-carbon bonds. Broken bonds should be filled with other atoms, preferably hydrogen, to avoid intermolecular condensation and generation of olefins and polycondensed aromatics. Although olefins are very valuable chemicals, the low stability of unsaturated bonds can degrade products by forming gums. The hydrogen inherently present in the water molecules can participate in the cracking reaction, but the extent of hydrogen donation from water is quite limited in supercritical water conditions due to high hydrogen-oxygen bond energy.

Accordingly, a need exists for a hydrocarbon upgrading process that incorporates the benefits of conventional supercritical water upgrading processes, while decreasing the large hydrocarbon radicals and olefins that are hydrothermally generated by supercritical water. The present disclosure addresses this need by introducing catalysts into the supercritical water reactor and, optionally, including hydrogen addition into the supercritical water hydrocarbon upgrading process.

Through catalyst and hydrogen addition, embodiments disclosed and described herein increase product yield of supercritical water (ScW) processes while providing additional treatment of the feedstock by exploiting the ScW process dissolution effect, high temperature, and pressure. In embodiments, the free large hydrocarbon and heteroatom radicals produced during ScW hydrothermal reactions and catalytic hydrogenolysis reactions are saturated at a pronounced rate by the effect of catalyst and hydrogen. This in turn improves sulfur removal and reduces combination and condensation reactions that lead to gummy olefin, asphaltenes, and coke formations. Furthermore, adding catalyst to the ScW hydrogenation process facilitates rupturing hydrogen-to-hydrogen (H—H) bonds in addition to favoring hydrogenolysis reactions under the high pressure of ScW processes. Large hydrocarbon molecules cracking and radicals saturation reactions in the catalytic ScW hydrogenation are favored by high operating pressure; therefore, increasing process severity in terms of higher pressures facilitates rupturing of large hydrocarbon and heteroatom bonds and hydrogenation of the generated radicals as well as increasing feedstock conversion. Therefore, adding catalyst and, optionally, hydrogen to a ScW process expands the application of the ScW technology for treating heavy feedstocks. Catalyst and hydrogen addition to the ScW process provides additional yields of middle distillate oils but at improved stability.

In accordance with one embodiment a process for upgrading a hydrocarbon-based composition comprises: combining a heated water stream and a pressurized, heated hydrocarbon-based composition in a mixing device to create a combined feed stream; introducing the combined feed stream into a supercritical water reactor operating at a temperature greater than a critical temperature of water and a pressure greater than a critical pressure of water; and at least partially converting the combined feed stream to an upgraded product, wherein at least one catalyst lobular structure is present in the supercritical water reactor.

BRIEF DESCRIPTION OF THE DRAWINGS

The following detailed description of specific embodiments of the present disclosure can be best understood when read in conjunction with the following drawings, in which.

DETAILED DESCRIPTION

Figure 1:
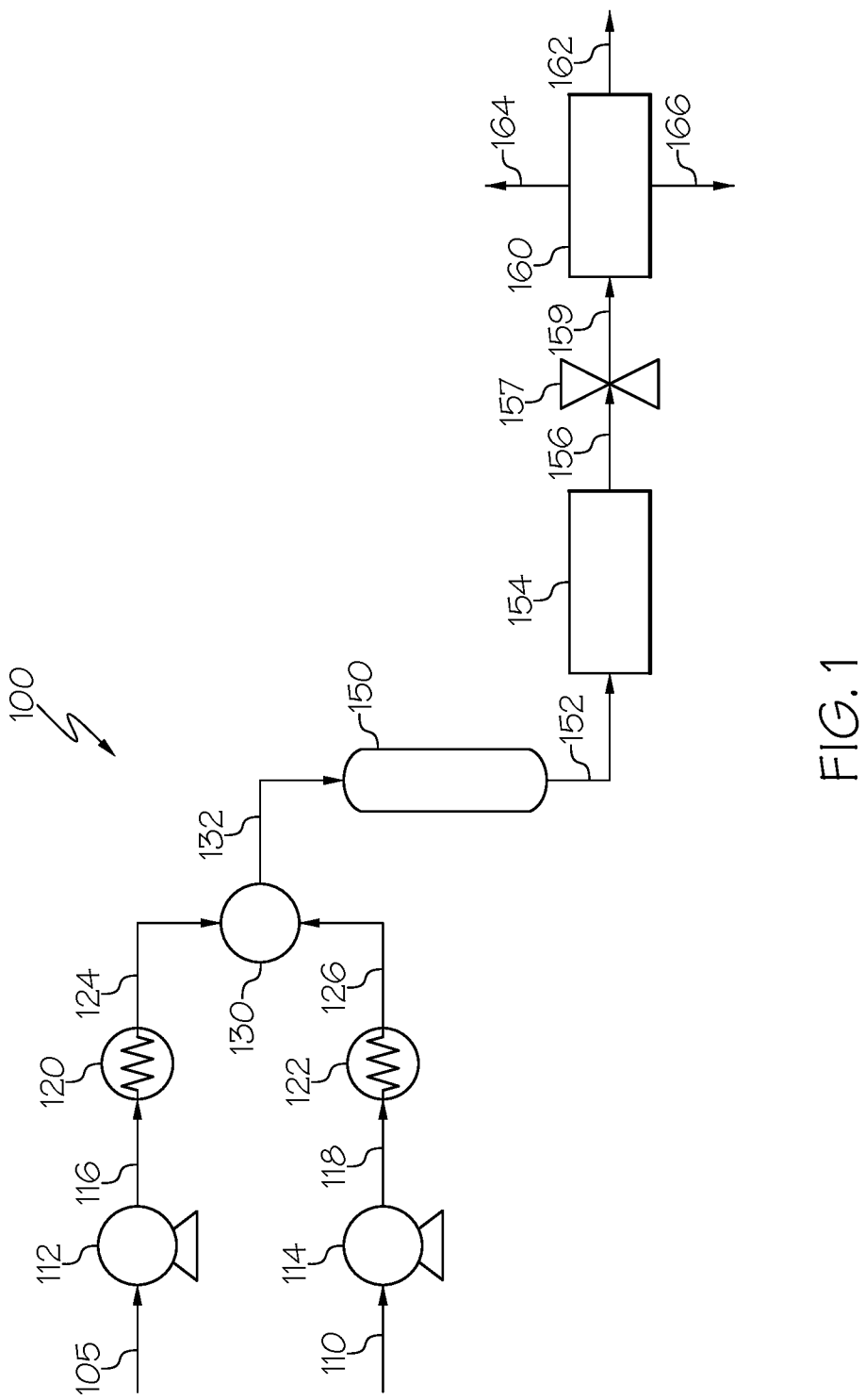
FIG. 1 is a schematic view of a process for upgrading a hydrocarbon-based composition, according to the present embodiments.

Embodiments of the present disclosure are directed to processes for upgrading hydrocarbon streams in a supercritical water reactor.

As used throughout the disclosure, "supercritical" refers to a substance at or above a pressure and a temperature greater than or equal to that of its critical pressure and temperature, such that distinct phases do not exist and the substance may exhibit the fast diffusion of a gas while dissolving materials like a liquid. As such, supercritical water is water having a temperature and pressure greater than or equal to the critical temperature and the critical pressure of water. At a temperature and pressure greater than or equal to the critical temperature and pressure, the liquid and gas phase boundary of water disappears, and the fluid has characteristics of both liquid and gaseous substances. Supercritical water is able to dissolve organic compounds like an organic solvent and has excellent diffusibility like a gas. Regulation of the temperature and pressure allows for continuous "tuning" of the properties of the supercritical water to be more liquid-like or more gas-like. Supercritical water has reduced density and lesser polarity, as compared to liquid-phase subcritical water, thereby greatly extending the possible range of chemistry that can be carried out in water. Water above its critical condition is neither a liquid nor gas but a single fluid phase that converts from being polar to non-polar.

As used throughout the disclosure, "upgrade" means to increase the API gravity, decrease the amount of impurities, such as sulfur, nitrogen, and metals, decrease the amount of asphaltene, and increase the amount of the light fraction.

Supercritical water has various unexpected properties as it reaches supercritical boundaries. Supercritical water has very high solubility toward organic compounds and has an infinite miscibility with gases. Furthermore, radical species can be stabilized by supercritical water through the cage effect (that is, a condition whereby one or more water molecules surrounds the radical species, which then prevents the radical species from interacting). Without being limited to theory, stabilization of radical species helps prevent inter-radical condensation and thereby reduces the overall coke production in the current embodiments. For example, coke production can be the result of the inter-radical condensation. In certain embodiments, supercritical water generates hydrogen gas through a steam reforming reaction and water-gas shift reaction, which is then available for the upgrading reactions.

Moreover, the high temperature and high pressure of supercritical water may give supercritical water a density of 0.123 grams per milliliter (g/mL) at 27 MPa and 450° C. Contrastingly, if the pressure was reduced to produce superheated steam, for example, at 20 MPa and 450° C., the superheated steam would have a density of only 0.079 g/mL. At that density, the hydrocarbons may interact with superheated steam to evaporate and mix into the vapor phase, leaving behind a heavy fraction that may generate coke upon heating. The formation of coke or coke precursor may plug the lines and must be removed. Therefore, supercritical water is superior to steam in some applications.

Specific embodiments will now be described with references to the figures. Whenever possible, the same reference numerals will be used throughout the drawings to refer to the same or like parts.

FIG. 1 schematically depicts a process 100 for upgrading a hydrocarbon-based composition 105, according to embodiments described herein.

The hydrocarbon-based composition 105 may refer to any hydrocarbon source derived from petroleum, coal liquid, or biomaterials. Possible sources for hydrocarbon-based composition may include crude oil, distilled crude oil, reduced crude oil, residue oil, topped crude oil, product streams from oil refineries, product streams from steam cracking processes, liquefied coals, liquid products recovered from oil or tar sands, bitumen, oil shale, asphaltene, biomass hydrocarbons, and the like. Many compositions are suitable for the hydrocarbon-based composition. In some embodiments, the hydrocarbon-based composition 105 may comprise heavy crude oil or a fraction of heavy crude oil. In other embodiments, the hydrocarbon-based composition 105 may include atmospheric residue (AR), atmospheric distillates, vacuum gas oil (VGO), vacuum distillates, or vacuum residue (VR), or cracked product (such as light cycle oil or coker gas oil). In some embodiments, the hydrocarbon-based composition may be combined streams from a refinery, produced oil, or other hydrocarbon streams, such as from an upstream operation. The hydrocarbon-based composition 105 may be decanted oil, oil containing 10 or more carbons (C10+ oil), or hydrocarbon streams from an ethylene plant. The hydrocarbon-based composition 105 may, in some embodiments, be liquefied coal or biomaterial-derivatives, such as bio fuel oil. In some embodiments, used lubrication (lube) oil or brake fluids may be used.

The hydrocarbon-based composition 105 may, in some embodiments, be naphtha or kerosene or diesel fractions. Such fractions may be used but may not be upgraded as efficiently by the supercritical water. Contaminated hydrocarbon fractions may also be used. In some embodiments, fractions with saltwater contamination may be used as the hydrocarbon-based composition 105. For instance, crude oil in market typically has a salt content below about 10 PTB (pounds of salt per 1000 barrels of oil). The salt in saltwater may be precipitated by the supercritical water to produce a desalted product, which may be desirable in some embodiments.

The hydrocarbon-based composition 105 may have a $T_5$ true boiling point (TBP) of less than 500° C., of less than 450° C., of less than 400° C., of less than 380° C., or of less than 370° C. In embodiments, the hydrocarbon-based composition 105 may have a $T_5$ TBP of from 200° C. to 500° C., from 200° C. to 450° C., from 200° C. to 425° C., from 200° C. to 400° C., from 200° C. to 380° C., from 200° C. to 370° C., from 250° C. to 500° C., from 250° C. to 450° C., from 250° C. to 425° C. from 250° C. to 400° C., from 250° C. to 380° C., from 250° C. to 370° C. from 260° C. to 500° C., from 260° C. to 450° C. from 260° C. to 425° C., from 260° C. to 400° C., from 260° C. to 380° C. from 260° C. to 370° C., from 300° C. to 500° C., from 300° C. to 450° C., from 300° C. to 425° C., from 300° C. to 400° C., from 300° C. to 380° C., from 300° C. to 370° C., from 325° C. to 500° C., from 325° C. to 450° C., from 325° C. to 425° C., from 325° C. to 400° C., from 325° C. to 380° C., from 325° C. to 370° C., from 350° C. to 500° C., from 350° C. to 450° C., from 350° C. to 425° C., from 350° C. to 400° C., from 350° C. to 380° C. from 350° C. to 370° C., or approximately 367° C.

The hydrocarbon-based composition 105 may have a $T_{90}$ TBP of less than or equal to 750° C. less than or equal to 700° C., or less than or equal to 650° C. In embodiments, the hydrocarbon-based composition 105 may have a $T_{90}$ TBP from 500° C. to 750° C., from 500° C. to 700° C. from 500° C. to 675° C. from 500° C. to 650° C., from 540° C. to 750° C., from 540° C. to 700° C. from 540° C. to 675° C. from 540° C. to 650° C., from 600° C. to 750° C., from 600° C. to 700° C., from 600° C. to 675° C. from 600° C. to 650° C., from 625° C. to 750° C. from 625° C. to 700° C. from 625° C. to 675° C. from 625° C. to 650° C., where the $T_{90}$ TBP is greater than the $T_5$ TBP previously described.

The hydrocarbon-based composition 105 may have an API gravity from 5° to 23°, from 5° to 20°, from 5° to 19°, from 5° to 15°, from 5° to 12°, from 8° to 23°, from 8° to 20°, from 8° to 19°, from 8° to 15°, from 8° to 12°, from 10° to 23°, from 10° to 20°, from 10° to 19°, from 10° to 15°, from 10° to 12°, or approximately 11°.

The hydrocarbon-based composition 105 may include greater than 2.7 weight percent (wt. %) or greater than 1.7 wt. % total sulfur content by weight of the hydrocarbon-based composition 105. In embodiments, the hydrocarbon-based composition 105 may include from 0.1 wt. % to 5 wt. %, from 0.1 wt. % to 4 wt. %, from 0.1 wt. % to 3.5 wt. %, from 0.5 wt. % to 5 wt. %, from 0.5 wt. % to 4 wt. %, from 0.5 wt. % to 3.5 wt. %, from 1.0 wt. % to 5 wt. %, from 1.0 wt. % to 4 wt. %, from 1.0 wt. % to 3.5 wt. %, from 1.3 wt. % to 5 wt. %, from 1.3 wt. % to 4 wt. %, from 1.3 wt. % to 3.5 wt. %, from 1.6 wt. % to 5 wt. %, from 1.6 wt. % to 4 wt. %, from 1.6 wt. % to 3.5 wt. %, from 1.8 wt. % to 5 wt. %, from 1.8 wt. % to 4 wt. %, from 1.8 wt. % to 3.5 wt. %, from 2.0 wt. % to 5 wt. %, from 2.0 wt. % to 4 wt. %, from 2.0 wt. % to 3.5 wt. %, from 2.3 wt. % to 5 wt. %, from 2.3 wt. % to 4 wt. %, from 2.3 wt. % to 3.5 wt. %, from 2.6 wt. % to 5 wt. %, from 2.6 wt. % to 4 wt. %, from 2.6 wt. % to 3.5 wt. %, from 2.8 wt. % to 5 wt. %, from 2.8 wt. % to 4 wt. %, from 2.8 wt. % to 3.5 wt. %, from 3.0 wt. % to 5 wt. %, from 3.0 wt. % to 4 wt. %, from 3.0 wt. % to 3.5 wt. %, or approximately 3.4 wt. % wt. % total sulfur content by weight of the hydrocarbon-based composition 105. The hydrocarbon-based composition 105 may include greater than 0.9 wt. % or greater than 0.3 wt. % wt. % total nitrogen content by weight of the hydrocarbon-based composition 105.

In embodiments, the hydrocarbon-based composition 105 may include from 0.01 wt. % to 2 wt. %, from 0.01 wt. % to 1.3 wt. %, from 0.1 wt. % to 2 wt. %, from 0.1 wt. % to 1.3 wt. %, from 0.2 wt. % to 2 wt. %, from 0.2 wt. % to 1.3 wt. %, from 0.4 wt. % to 2 wt. %, from 0.4 wt. % to 1.3 wt. %, from 0.6 wt. % to 2 wt. %, from 0.6 wt. % to 1.3 wt. %, from 0.8 wt. % to 2 wt. %, from 0.8 wt. % to 1.3 wt. %, from 1.0 wt. % to 2 wt. %, from 1.0 wt. % to 1.3 wt. %, or approximately 1.2 wt. % wt. % total nitrogen content by weight of the hydrocarbon-based composition 105. The hydrocarbon-based composition 105 may include greater than 1.7 wt. % or greater than 0.3 wt. % asphaltene (heptane-insoluble) by weight of the hydrocarbon-based composition 105.

In embodiments, the hydrocarbon-based composition 105 may include from 0.01 wt. % to 6 wt. %, from 0.01 wt. % to 5 wt. %, from 0.01 wt. % to 4.9 wt. %, from 0.1 wt. % to 6 wt. %, from 0.1 wt. % to 5 wt. %, from 0.1 wt. % to 4.9 wt. %, from 0.2 wt. % to 6 wt. %, from 0.2 wt. % to 5 wt. %, from 0.2 wt. % to 4.9 wt. %, from 0.4 wt. % to 6 wt. %, from 0.4 wt. % to 5 wt. %, from 0.4 wt. % to 4.9 wt. %, from 0.6 wt. % to 6 wt. %, from 0.6 wt. % to 5 wt. %, from 0.6 wt. % to 4.9 wt. %, from 0.8 wt. % to 6 wt. %, from 0.8 wt. % to 5 wt. %, from 0.8 wt. % to 4.9 wt. %, from 1.0 wt. % to 6 wt. %, from 1.0 wt. % to 5 wt. %, from 1.0 wt. % to 4.9 wt. %, from 1.6 wt. % to 6 wt. %, from 1.6 wt. % to 5 wt. %, from 1.6 wt. % to 4.9 wt. %, from 1.8 wt. % to 6 wt. %, from 1.8 wt. % to 5 wt. %, from 1.8 wt. % to 4.9 wt. %, from 2.0 wt. % to 6 wt. %, from 2.0 wt. % to 5 wt. %, from 2.0 wt. % to 4.9 wt. %, from 2.5 wt. % to 6 wt. %, from 2.5 wt. % to 5 wt. %, from 2.5 wt. % to 4.9 wt. %, from 3.0 wt. % to 6 wt. %, from 3.0 wt. % to 5 wt. %, from 3.0 wt. % to 4.9 wt. %, from 4.7 wt. % to 6 wt. %, from 4.7 wt. % to 5 wt. %, from 4.7 wt. % to 4.9 wt. %, or approximately 4.8 wt. % asphaltene (heptane-insoluble) by weight of the hydrocarbon-based composition 105.

The hydrocarbon-based composition 105 may include greater than 9 parts per million (ppm) or greater than 4 ppm metals. In embodiments, the metals may be vanadium, nickel, or both. In embodiments, the hydrocarbon-based composition may include from 1 ppm to 100 ppm, from 1 ppm to 83 ppm, from 5 ppm to 100 ppm, from 5 ppm to 83 ppm, from 10 ppm to 100 ppm, from 10 ppm to 83 ppm, from 50 ppm to 100 ppm, from 50 ppm to 83 ppm, or approximately 82 ppm metals.

The hydrocarbon-based composition 105 may have a viscosity at 50° C. of greater than 27 centiStokes (cSt) or greater than 89 cSt. In embodiments, the hydrocarbon-based composition 105 may have a viscosity at 50° C. from 5 cSt to 1000 cSt, from 5 cSt to 700 cSt, from 5 cSt to 650 cSt, from 10 cSt to 1000 cSt, from 10 cSt to 700 cSt, from 10 cSt to 650 cSt, from 100 cSt to 1000 cSt, from 100 cSt to 700 cSt, from 100 cSt to 650 cSt, from 300 cSt to 1000 cSt, from 300 cSt to 700 cSt, from 300 cSt to 650 cSt, from 500 cSt to 1000 cSt, from 500 cSt to 700 cSt, from 500 cSt to 650 cSt, or approximately 640 cSt.

As shown in FIG. 1, the hydrocarbon-based composition 105 may be pressurized in hydrocarbon pump 112 to create pressurized hydrocarbon-based composition 116. The pressure of pressurized hydrocarbon-based composition 116 may be at least 22.1 megapascals (MPa), which is approximately the critical pressure of water. Alternatively, the pressure of the pressurized hydrocarbon-based composition 116 may be between 23 MPa and 35 MPa, or between 24 MPa and 30 MPa. For instance, the pressure of the pressurized hydrocarbon-based composition 116 may be between 25 MPa and 29 MPa, 26 MPa and 28 MPa, 25 MPa and 30 MPa, 26 MPa and 29 MPa, or 24 MPa and 28 MPa.

The pressurized hydrocarbon-based composition 116 may then be heated in one or more hydrocarbon pre-heaters 120 to form pressurized, heated hydrocarbon-based composition 124. In one embodiment, the pressurized, heated hydrocarbon-based composition 124 has a pressure greater than the critical pressure of water and a temperature greater than 75° C. Alternatively, the temperature of the pressurized, heated hydrocarbon-based composition 124 is between 120° C. and 350° C., or between 150° C. and 300° C., or between 175° C. and 275° C., or between 200° C. and 250° C. . . . According to embodiments, the pressurized, heated hydrocarbon-based composition 124 should not be heated above about 350° C., and in some embodiments, the pressurized, heated hydrocarbon-based composition should not be heated above 300° C. to avoid the formation of coking products. See Hozuma, U.S. Pat. No. 4,243,633, which is incorporated by reference in its entirety. While some coke or coke precursor products may be able to pass through process lines without slowing or stopping the process 100, the formation of these potentially problematic compounds should be avoided if possible.

Embodiments of the hydrocarbon pre-heater 120 may include a natural gas fired heater, heat exchanger, or an electric heater or any type of heater known in the art. In some embodiments, not shown, the pressurized, heated hydrocarbon-based composition 124 may be heated in a double pipe heat exchanger. For example, and not by way of limitation, the double pipe heat exchanger may heat the pressurized, heated hydrocarbon-based composition 124 after it has combined with a heated water stream 126 to form a combined feed stream 132.

The water stream 110 may be any source of water, such as a water stream having conductivity of less than 1 micro-Siemens (μS)/centimeters (cm), such as less than 0.1 μS/cm. The water stream 110 may also include demineralized water, distilled water, boiler feed water (BFW), and deionized water. In at least one embodiment, water stream 110 is a boiler feed water stream. Water stream 110 is pressurized by water pump 114 to produce pressurized water stream 118. The pressure of the pressurized water stream 118 is at least 22.1 MPa, which is approximately the critical pressure of water. Alternatively, the pressure of the pressurized water stream 118 may be between 23 MPa and 35 MPa, or between 24 MPa and 30 MPa. For instance, the pressure of the pressurized water stream 118 may be between 25 MPa and 29 MPa, 26 MPa and 28 MPa, 25 MPa and 30 MPa, 26 MPa and 29 MPa, or 24 MPa and 28 MPa.

The pressurized water streams 118 may then be heated in a water pre-heater 122 to create heated water stream 126. According to embodiments, the temperature of the heated water stream 126 is greater than 400° C. In embodiments, the temperature of the heated water stream 126 may be from 400° C. to 550° C., from 425° C. to 525° C., from 450° C. to 500° C., from 450° C. to 475° C., or from 475° C. to 500° C.

Similar to hydrocarbon pre-heater 120, suitable water pre-heaters 122 may include a natural gas fired heater, a heat exchanger, and an electric heater. The water pre-heater 122 may be a unit separate and independent from the hydrocarbon pre-heater 120.

The heated water stream 126 and the pressurized, heated hydrocarbon-based composition 124 may then be mixed in a feed mixer 130 to produce a combined feed stream 132. The feed mixer 130 can be any type of mixing device capable of mixing the heated water stream 126 and the pressurized, heated hydrocarbon-based composition 124. In one embodiment, the feed mixer 130 may be a mixing tee. The feed mixer 130 may be an ultrasonic device, a small continuous stir tank reactor (CSTR), or any suitable mixer. The volumetric flow ratio of each component fed to the feed mixer 130 may vary. It should also be understood that in one or more embodiments, which are not shown, multiple feed mixers may be used to individually mix the pressurized, heated hydrocarbon-based composition 124 and the heated water stream 126 in any combination. In embodiments, the volumetric flow ratio of the heated hydrocarbon-based composition 124 to the heated water stream 126 may be from 1:10 to 1:1, from 1:10 to 1:5, from 1:10 to 1:2, from 1:5 to 1:1, from 1:5 to 1:2, from 1:4 to 1:9, from 1:2 to 1:9, or from 1:2 to 1:1 at standard ambient temperature and ambient pressure (SATP). In embodiments, it is desirable that the volumetric flow rate of water is greater than the volumetric flow rate of hydrocarbons. Without being bound by any particular theory, it is believed that heavy oils such as residual and bituminous types are rich in fractions that contain asphaltenes and heavy polycondensed aromatic molecules. These fractions yield a high viscosity. Mixing hot compressed water, such as supercritical water, reduces the viscosity and improves the oil's mobility through the developed mixed oil/water phase. Therefore, having a water flow rate that is higher than an oil flow rate improves the mixture mobility especially for highly viscous oils. Furthermore, increasing the water-to-oil ratio improves the caging effect of water molecules surrounding the asphaltenic and polycondensed aromatic molecules and increases the distance between them to prevent their propagation and association.

The combined feed stream 132 may then be introduced to the supercritical water reactor 150 that is configured to upgrade the combined feed stream 132. The supercritical water reactor 150 may be an upflow, downflow, or horizontal flow reactor. An upflow, downflow or horizontal reactor refers to the direction the supercritical water and hydrocarbon-based composition flow through the supercritical water reactor 150. An upflow, downflow, or horizontal flow reactor may be chosen based on the desired application and system configuration. Without intending to be bound by any theory, in downflow supercritical reactors, heavy hydrocarbon fractions may flow very quickly due to having a greater density, which may result in shortened residence times (known as channeling). This may hinder upgrading, as there is less time for reactions to occur. Upflow supercritical reactors have a uniform increased residence time distribution (no channeling), but may experience difficulties due to undissolved portion of heavy fraction and large particles, such as carbon-containing compounds in the heavy fractions, accumulating in the bottom of the reactor. This accumulation may hinder the upgrading process and plug the reactor. Upflow reactors typically utilize catalysts to provide increased contact with the reactants; however, the catalysts may break down due to the harsh conditions of supercritical water, forming insoluble aggregates, which may generate coke. Horizontal reactors may be useful in applications that desire phase separation or that seek to reduce pressure drop, however; the control of hydrodynamics of internal fluid is difficult. Each type of reactor flow has positive and negative attributes that vary based on the applicable process; however, in some embodiments, an upflow or downflow reactor may be favored.

The supercritical water reactor 150 may operate at a temperature greater than the critical temperature of water and a pressure greater than the critical pressure of water. In one or more embodiments, the supercritical water reactor 150 may have a temperature greater than or equal to 374° C., such as from 380° C. to 550° C., or form 390° C. to 470° C. The supercritical water reactor 150 may be an isothermal or non-isothermal reactor. The reactor may be a tubular-type vertical reactor, a tubular-type horizontal reactor, a vessel-type reactor, a tank-type reactor having an internal mixing device, such as an agitator, or a combination of any of these reactors. Moreover, additional components, such as a stirring rod or agitation device may also be included in the supercritical water reactor 150.

The supercritical water reactor 150 may have dimensions defined by the equation L/D, where L is a length of the supercritical water reactor 150 and D is the diameter of the supercritical water reactor 150. In one or more embodiments, the L/D value of the supercritical water reactor 150 may be sufficient to achieve a superficial velocity of fluid greater than 0.5 meter (m)/minute (min), or an L/D value sufficient to achieve a superficial velocity of fluid between 1 m/min and 5 m/min. Such relatively high fluid velocity is desired to attain full turbulence of the internal fluid. The desired Reynolds number (a measurement of fluid flow) is greater than 5000. Reynolds number is given by the relationship:

$$Re = \frac{uD}{v}$$

where u is the superficial velocity, D is the diameter of the supercritical upgrading reactor, and v is the kinematic viscosity. If that equation is rewritten as $$u = \frac{vRe}{D}$$

it can be observed from this relationship that by decreasing the reactor diameter (D) the superficial velocity (u) is increased (because u and D are indirectly proportional to each other $$\left(u\,\alpha\,\frac{1}{D}\right)\!\!\Big).$$

For a fixed reactor length at a reference case, decreasing the reactor diameter (D) will increase the ratio (L/D). Furthermore, by increasing the superficial velocity (u), Reynolds Number (Re) is increased (because u and Re are directly proportional to each other (u $\alpha$ Re). Therefore, from the above rationale, in order to maintain the flow in high flow turbulence regime (Re>5000), it is required to increase the superficial velocity, and/or decrease the reactor's diameter, and by decreasing the reactor's diameter, the ratio (L/D) is also increased.

In one or more embodiments, the pressure within the supercritical water reactor 150 during the process is greater than or equal to 22.1 MPa, such as from 23 MPa to 35 MPa, from 24 MPa to 32 MPa, from 24 MPa to 30 MPa, from 25 MPa to 30 MPa, or from 27 MPa to 30 MPa.

In some embodiments, the residence time of the internal fluid in the supercritical water reactor 150 may be longer than 5 seconds, such as longer than 1 minute. In some embodiments, the residence time of the internal fluid in the supercritical water reactor 150 may be from 1 to 30 minutes, from 1 to 20 minutes, from 1 to 15 minutes, from 1 to 12 minutes, from 1 to 10 minutes, from 1 to 8 minutes, from 1 to 5 minutes, from 1 to 2 minutes, from 2 to 30 minutes, from 2 to 20 minutes, from 2 to 15 minutes, from 2 to 12 minutes, from 2 to 10 minutes, from 2 to 8 minutes, from 2 to 5 minutes, from 5 to 30 minutes, from 5 to 20 minutes, from 5 to 15 minutes, from 5 to 12 minutes, from 5 to 10 minutes, from 5 to 8 minutes, from 8 to 30 minutes, from 8 to 20 minutes, from 8 to 15 minutes, from 8 to 12 minutes, from 8 to 10 minutes, from 10 to 30 minutes, from 10 to 20 minutes, from 10 to 15 minutes, from 10 to 12 minutes, from 12 to 30 minutes, from 12 to 20 minutes, from 12 to 15 minutes, from 15 to 30 minutes, from 15 to 20 minutes, or from 20 to 30 minutes. In embodiments, the residence time may be no greater than 15 minutes and no less than 2 minutes.

Thermal processes are temperature driven chemical processes that convert and upgrade petroleum heavy hydrocarbons via radical mechanism. The typical thermal cracking processes temperature range is between 495° C. and 540° C. and typical pressure is in the range of 10 and 40 atmospheres. The severities of thermal processes determine the extent of feed conversion. Process severity refers to the levels of operating conditions in terms of combinations of temperature and space times. Thermal processes utilize heat to crack heavy hydrocarbons into lighter end products, thereby reducing the oil viscosity without catalyst addition. However, the presence of asphaltenes in the heavy hydrocarbons limits upgradability. The amount of asphaltene in the hydrocarbon stream is directly related to its affinity to form coke, due to asphaltene condensation reactions. See Yan, T. Y., *Characterization of visbreaker feeds*. Fuel, 1990. 69 (8): p. 1062-1064. The reactions taking place in thermal processes are a combination of endothermic reactions that proceed according to free radical mechanisms. The chemistry of thermal cracking is rather complex, and the degree of complexity increases with the increase in process severity for heavier feedstocks. Through thermal cracking, chemical bonds of different species present in the oil are subjected to endothermic homolytic dissociation reactions. During this bond cleavage procedure the asphaltene solvating appendages are detached and the aliphatic bridges, connecting the polyaromatic clusters within the asphaltene molecules, are broken. This makes the asphaltene aggregates prone to precipitation in a less peptizing environment. In addition, dehydrogenation reactions of asphaltene aggregates result in increasing C/H ratios, which increase the molecular weight of the asphaltene molecules. Thermal processes proceed by initiation reactions where a portion of feed hydrocarbon molecules (M) break into multiple hydrocarbon radicals (R·), by homolytic cleavage of the C—C bonds. As a result, free radicals are accumulated until reaching a steady-stable concentration that allows the thermal cracking propagation reactions to continue. The generated free radicals shown by Equation 1 below drive the rest of the reactions.

$$M \rightarrow R \cdot + R_n \cdot \tag{1}$$

The above reaction step is followed by a chain of reactions, which includes hydrogen abstraction and addition, and radical cracking and recombination. The produced free radicals abstract hydrogen from nearby molecules, as shown by Equation 2.

$$R \cdot + M \rightarrow R_1 \cdot + RH \tag{2}$$

Molecules are dealkylated, simultaneously, to produce smaller alkane radicals, as shown by Equation 3.

$$M \rightarrow R_2 \cdot + R_3 \cdot \tag{3}$$

where, $R_1 > R_2 > R_3$, meaning that the $R_1$ radical is larger than the $R_2$ radical, which is larger than the $R_3$ radical.

Under constant flow, reactions 1-3 continue to take place unless interrupted by major change in feedstock properties or operating conditions. If the temperature or space time increases beyond the stability limit, heavy free radical combination reactions escalate to produce larger and heavier molecules. These combination reactions terminate the reaction mechanism and cause asphaltene condensation, hence called condensation reactions, as shown by Equation 4.

$$R \cdot + R \cdot \rightarrow M \tag{4}$$

The combinations resulting from termination reactions may produce heavier compounds than the ones originally present in the feedstock. ScW provides the caging effect where one or more heavy oil molecules are surrounded by supercritical water and that prevents or reduces reactions between the cracked large free hydrocarbon, heteroatoms molecules, and radicals.

The high temperature of the ScW process induces thermal cracking of chemical bonds, such as carbon-sulfur bonds and carbon-carbon bonds, while the high pressure reduces mass transfer limitations. Hydrogen availability facilitates saturating the broken bonds thereby reducing heteroatoms (such as desulfurization and denitrogenation) and intermolecular condensation reactions that generate olefins, asphaltenes, and coke. Although hydrogen in the water molecules can participate in cracking reactions, the extent of hydrogen donation from water is quite limited due to high hydrogen-oxygen bond energy. Thus, without hydrogen addition, products from ScW processes have higher aromaticity and olefinicity than those in the feed, which has negative effect on the stability and economic value of the products.

Sulfur-sulfur bond rupturing indicated by reaction 5 below requires relatively lower dissociation energy (~270 KJ/mol) when compared to aliphatic carbon-carbon bond (~360-370 kJ/mol) or beta scission of aromatic compounds having aliphatic chains (~325 KJ/mol).

$$RS\text{--}SRn \rightarrow RS \cdot + Rn S \cdot \tag{5}$$

Hydrogen availability in the ScW hydrogenation reaction medium reduces hydrogen abstraction from hydrocarbon molecules. It is believed that the hydrocarbon and sulfide radicals that are thermally generated from reaction (5) induce atomic hydrogen abstraction reaction from molecular hydrogen ($H_2$) under high hydrogen partial pressure according to reaction 6:

$$RS \cdot + H_2 \rightarrow RSH + H \cdot \qquad (6)$$

The resulting free atomic hydrogen radical is highly reactive to saturate generated free radicals such as organosulfur radicals and/or hydrocarbon radicals as indicated by reactions 7 and 8, respectively.

$$RS \cdot + 3H \cdot \rightarrow RH + H_2S \qquad (7)$$

$$Rn \cdot + H \cdot \rightarrow RnH \qquad (8)$$

The generated $H_2S$ is known to facilitate hydrogen transfer at temperatures as low as 171° C., thereby $H_2S$ could be exploited as a catalytic promoter. Hydrocarbon radicals generated by thermal bond scission could abstract atomic hydrogen from $H_2S$, as shown by reaction (9):

$$R\!-\!S\!-\!R + H_2S + 2H_2 \rightarrow 2RH + 2H_2S \qquad (9)$$

Non-catalytic ScW hydrogenation has many advantages in upgrading heavy oil; however, the extent of upgrading is limited if deeper hydrogenation is required. Use of heterogeneous or homogenous catalysts in ScW hydrogenation processes is one of very promising solutions to facilitate desulfurization and upgrading reactions in supercritical water condition. For example, catalyst utilization in ScW hydrogenation process improves selectivity of desulfurization processes through converting more sulfur to $H_2S$. The increased amount of $H_2S$ as a result of desulfurization could be utilized to further desulfurize the oil as shown in reaction 9 above. Furthermore, the presence of catalyst in ScW hydrogenation process could also improve the selectivity of steam reforming reactions as shown by reaction (10).

$$C_nH_m + nH_2O \rightarrow (n+m/2)H_2 + nCO \text{ (steam reforming)} \qquad (10)$$

The generated carbon monoxide would also be utilized selectively to induce water-gas shift reaction (11).

$$CO + H_2O \rightarrow CO_2 + H_2 \text{ (water gas-shift)} \qquad (11)$$

Besides, the generated carbon monoxide and $H_2S$ would also be utilized selectively to induce additional hydrogen production by reaction (12).

$$CO + H_2S \rightarrow COS + H_2 \qquad (12)$$

However, utilizing heterogeneous or homogenous catalyst in ScW hydrogenation possess technical challenges due to the harsh condition of ScW that makes most of catalyst unstable in the medium. Disintegration of heterogeneous catalyst and phase transformation to an inactive form and sintering of homogeneous catalyst, such as organometallic compounds, are frequently observed under ScW conditions. Furthermore, separating homogeneous catalyst such as organometallic compounds from the product requires complicated separation procedure, resulting in losses in product liquid yield associated with the catalyst separation, and complex metals recovery and separation procedure if the catalytic particles are to be recovered and recycled.

Embodiments of the present disclosure address these, and other, issues of using catalysts in the high temperature and high-pressure conditions of ScW processes. Adding catalyst to the ScW hydrogenation process facilitates rupturing of H—H bonds in addition to favoring hydrogenolysis reactions under the high pressure of ScW. The ScW process hydrothermally cracks the hydrocarbon molecules under high operating pressures (250-300 bars), which are higher than hydrocracking pressures. Under this high-pressure range, catalytic hydrogenation could largely remove sulfur, suppress gummy olefins generation, heavy hydrocarbon radicals polymerization, and condensation reactions that lead to asphaltenes and coke formation in thermal cracking.

To achieve the benefits provided by catalytic hydrogenation, unsupported solid lobular catalyst structures that extend along length of supercritical water reactor 150 are provided in embodiments. The non-porous high surface area catalyst lobular structures can sustain the harsh conditions of the ScW dissolution effect, high temperature, and high pressure, and have high mechanical and structural integrity that avoid a sintering effect. Adding catalyst to the ScW process largely improves desired product selectivities and facilitates oil conversion at lower severities, which would allow extended uninterrupted operation time. Consequently, including a catalyst expands the severity window of ScW hydrogenation to increase yield of liquid product while removing heteroatoms (for example better desulfurization and denitrogenation) and lower asphaltenes and coke generation.

Figure 2A:
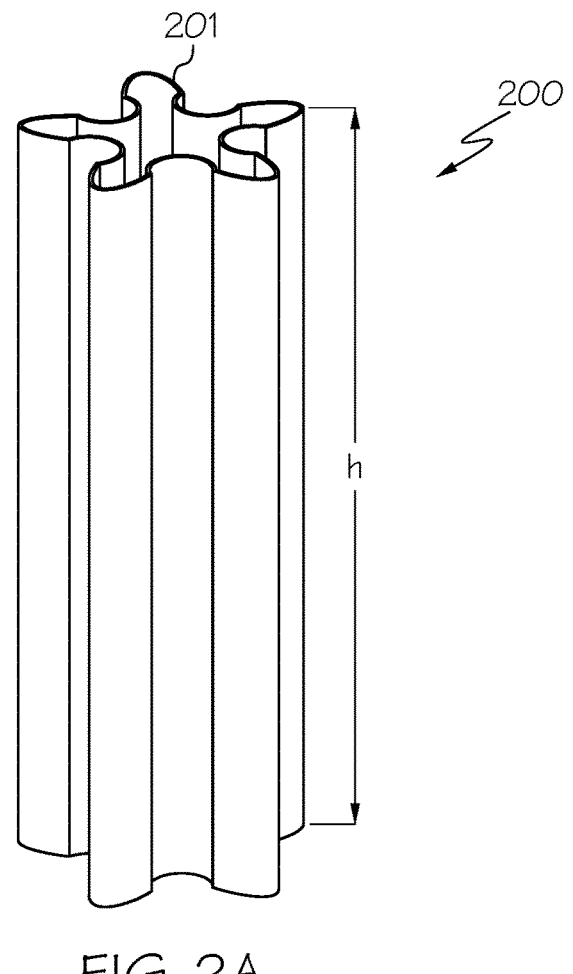
FIG. 2A is a perspective view of a catalyst lobular structure according to embodiments disclosed and described herein.
Figure 2B:
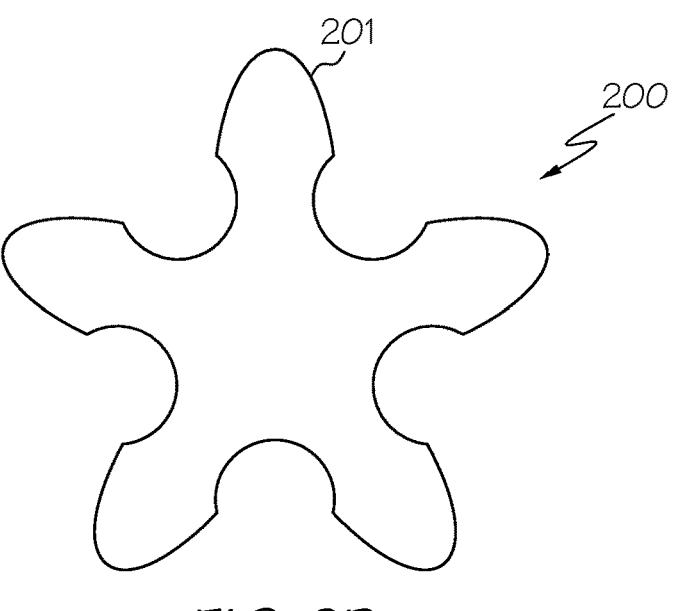
FIG. 2B is a top view of a catalyst lobular structure according to embodiments disclosed and described herein.

With reference now to FIG. 2A and FIG. 2B, catalyst lobular structures 200 according to embodiments disclosed and described herein will be described. FIG. 2A is an isometric view of a catalyst lobular structure 200 according to embodiments, and FIG. 2B is a top view of a catalyst lobular structure 200 according to embodiments. In the embodiments depicted in FIG. 2A and FIG. 2B, the catalyst lobular structure 200 has a height (h) and five lobes 201. In embodiments, the height is at least 25% of the height of the supercritical water reactor, such as at least 30%, at least 35%, at least 40%, at least 45%, at least 50%, at least 55%, at least 60%, at least 65%, at least 70%, or at least 75% of the height of the supercritical water reactor. However, it should be understood that, in other embodiments, the catalyst lobular structure 200 could have a different number of lobes, such as two lobes, three lobes, four lobes, six lobes, seven lobes, etc. According to one or more embodiments, the high surface area catalyst lobular structures can be placed adjacent to each other within the supercritical water reactor 150 at minimum distances to allow for increased surface area of the lobular catalyst structures 200 as well as maximizing contact time between the combined feed stream 132 and the catalyst lobular structures 200. The catalyst lobular structures 200 are, in embodiments, made in unsupported lobular shapes, and acute angle shapes are avoided. The lobular shape, such as those of the embodiments depicted in FIG. 2A and FIG. 2B, provided the largest catalytic surface area as well as minimizing the potential for coke and solids depositions on the catalyst lobular structure 200.

According to one or more embodiments, before the combined feed stream 132 is injected into the supercritical water reactor 150, the catalytic lobular structures 200 are first pretreated by flowing hot and compressed water at a temperature of 373° C. to 500° C.—such as 400° C. to 475° C., or 425° C.—to 450° C.—and a pressure of 22 MPa to 30 MPa-such as 23 MPa to 28 MPa, 24 MPa to 27 MPA, or about 35 MPa—to pre-condition the catalytic lobular structures 200 to operating conditions and to remove any impurities attached to the catalyst lobular structure surface. The unsupported catalyst lobular structures 200 are, according to embodiments, not porous and the thickness and weight of each catalyst lobular structure 200 depends on the hydrocarbon-based composition 105 properties. For example, if the hydrocarbon-based composition 105 contains corrosive alkali metals and erosive particulate, then, the thickness of the catalyst lobular structure 200 should be selected after estimating corrosion and/or erosion rates. The catalyst lobular structures 200 can, according to embodiments, be selected from transition metals, for example Fe, Ni, Pt, Mo, Cr. Zn, and combination thereof with or without additives. For instance, the catalyst lobular structure 200 can be made from high nickel alloys such as Hastelloy-C and Inconel 625. Transition metals that can be used include Group 3 to Group 12 elements. Additives include aluminum, silicon, boron, gallium, indium, and bismuth. Additives can also incorporate carbon, calcium, sodium, and potassium. Furthermore, in embodiments, the catalyst lobular structure 200 has a composition gradient throughout its depth. For example, the surface of the catalyst lobular structure 200 may be enriched with nickel while a bulk side of the catalyst lobular structure 200 has lower content of nickel and content of iron and/or molybdenum, etc. Furthermore, the catalytic lobular structure 200 can be made by cladding metals onto lobular structured ceramic materials, according to one or more embodiments.

Selecting a plurality of catalyst lobular structure types-such as by having catalyst lobular structures 200 made from multiple metals-inside a single reactor may provide multiple catalytic functionalities to produce, in situ, multiple desired products and remove multiple heteroatoms. For example, selecting a nickel-platinum catalyst lobular structure 200 in supercritical water reactor 150 could selectively increase the steam reforming reactions (reaction 10 above). Incorporating additional lobular catalytic structures 200 made from iron-chrome-zinc into the supercritical water reactor 150 may produce additional hydrogen using the carbon monoxide from the previous reaction through water-gas shift reaction (reaction 11 above). Adding a Co—Mo catalyst lobular structure 200 catalyst to the supercritical water reactor 150 would promote hydrotreating. Also, adding a Pt—Pd catalyst lobular structure 200 to the supercritical water reactor 150 would promote hydrogenolysis. Accordingly, in one or more embodiments, a plurality of catalyst lobular structures 200 made from different materials may be provided within the supercritical water reactor 150 to provide different catalytic functions.

Figure 3:
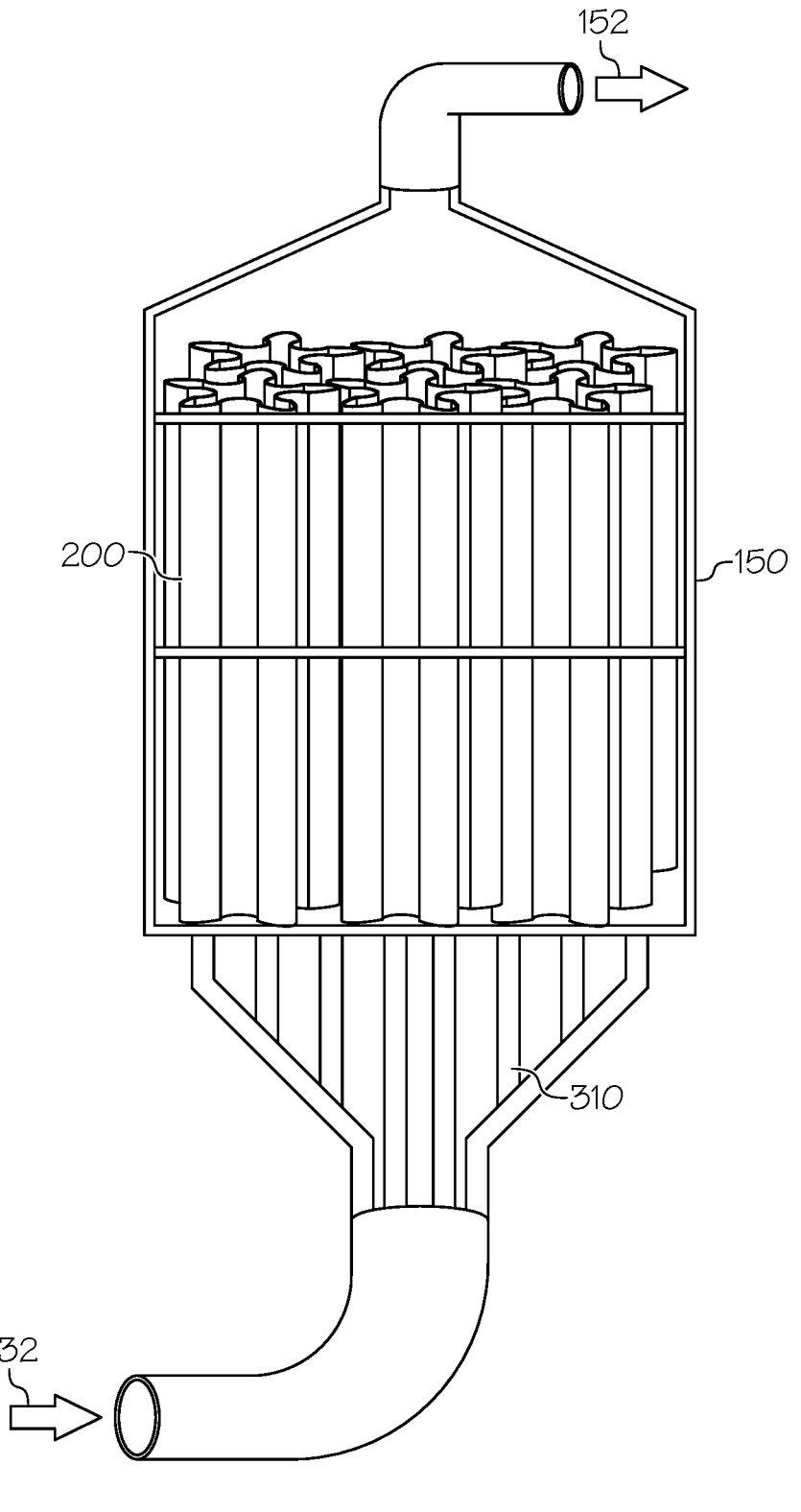
FIG. 3 is a schematic of a supercritical water reactor comprising a catalyst lobular structure according to embodiments disclosed and described herein.

A plurality of catalyst lobular structures 200 may be incorporated into the supercritical water reactor 150 by connecting the catalyst lobular structures 200 with supports, as discussed with reference to FIG. 3. It should be understood that any type of physical, chemical, or mechanical connection may be used to connect the catalyst lobular structures 200 to the supports. As shown in FIG. 3, supports 310 extend from the bottom of the supercritical water reactor 150 and catalyst lobular structures 200 are supported within the supercritical water reactor 150 by the supports 310. Although the embodiment depicted in FIG. 3 shows the supports 310 located at the bottom of the supercritical water reactor 150, it should be understood that in other embodiments, the supports 310 may be attached to the top and/or sides of the supercritical water reactor 150. Thermal expansion of the catalyst lobular structures 200 should be considered when sizing the catalyst lobular structures 200 and their supports 310 to allow for natural metal expansion when heated and to avoid mechanical stress, cracks, and/or bends. The supports 310 and catalyst lobular structures 200 can be utilized in all flow regimes (laminar and non-laminar) and be used for all types of feedstocks (Newtonian and non-Newtonian).

The catalyst lobular structures 200 disclosed and described herein allow a catalyst to be used in the harsh conditions with the supercritical water reactor 150. Under supercritical water conditions described herein above, using a conventional heterogeneous or homogenous catalyst is generally not possible because conventional heterogeneous or homogenous catalysts will degrade in the supercritical water reactor 150. Specifically, supercritical water has extremely high dissolution effects that destabilize conventional catalysts systems by phase transformation into an inactive form and disintegrating heterogeneous catalyst by causing sintering of active species in homogenous catalysts, such as organometallic compounds. Furthermore, using homogenous catalysts ad complicated separation procedures for segregating the catalyst from the product. However, the unsupported catalyst lobular structures 200 disclosed and described herein can tolerate the harsh conditions of the supercritical water reactor 150 by having a catalyst made from catalytic slabs having appreciable strength while at the same time having a sufficient surface area, activity, and selectivity. The supercritical water generates the hydrocarbon and heteroatom radicals mainly through hydrothermal and pressure effects while the catalyst lobular structures 200 facilitates hydrogen transfer to the generated radicals. Without the catalyst, only limited radical saturations take place.

Referring again to FIG. 1, the upgraded product 152 may then be transferred to a cooler 154 and cooled to a temperature from 150° C. to 250° C., from 150° C. to 225° C., from 150° C. to 200° C., from 150° C. to 175° C., from 175° C. to 250° C., from 175° C. to 225° C., from 175° C. to 200° C., from 200° C. to 250° C., from 200° C. to 225° C., or from 225° C. to 250° C. to form a cooled, upgraded product 156. Various cooling devices are contemplated for the cooler 154, such as a heat exchanger.

Upon exiting the cooler 154, the pressure of the cooled, upgraded product 156 may be introduced into a depressurizer 157 to create a depressurized, upgraded product 159, which may have a pressure from 0.01 MPa to 1.0 MPa, from 0.01 MPa to 0.8 MPa, from 0.01 MPa to 0.5 MPa, from 0.01 MPa to 0.3 MPa, from 0.01 MPa to 0.1 MPa, from 0.01 MPa to 0.08 MPa, from 0.01 MPa to 0.05 MPa, from 0.01 MPa to 0.03 MPa, from 0.03 MPa to 1.0 MPa, from 0.03 MPa to 0.8 MPa, from 0.03 MPa to 0.5 MPa, from 0.03 MPa to 0.3 MPa, from 0.03 MPa to 0.1 MPa, from 0.03 MPa to 0.08 MPa, from 0.03 MPa to 0.05 MPa, from 0.05 MPa to 1.0 MPa, from 0.05 MPa to 0.8 MPa, from 0.05 MPa to 0.5 MPa, from 0.05 MPa to 0.3 MPa, from 0.05 MPa to 0.1 MPa, from 0.05 MPa to 0.08 MPa, from 0.08 MPa to 1.0 MPa, from 0.08 MPa to 0.8 MPa, from 0.08 MPa to 0.5 MPa, from 0.08 MPa to 0.3 MPa, from 0.08 MPa to 0.1 MPa, from 0.1 MPa to 1.0 MPa, from 0.1 MPa to 0.8 MPa, from 0.1 MPa to 0.5 MPa, from 0.1 MPa to 0.3 MPa, from 0.3 MPa to 1.0 MPa, from 0.3 MPa to 0.8 MPa, from 0.3 MPa to 0.5 MPa, from 0.5 MPa to 1.0 MPa, from 0.5 MPa to 0.8 MPa, or from 0.8 MPa to 1.0 MPa. The depressurizing can be achieved by many devices, for example, a valve.

The depressurized, upgraded product 159 may then be passed to a gas/oil/water separator 160. The gas/oil/water separator 160 may separate the depressurized, upgraded product 159 into a first gas fraction 164, a liquid oil fraction 162, and a water fraction 166. The gas/oil/water separator 160 may be any separator known in the industry. While the gas/oil/water separator 160 may separate the depressurized, upgraded product 159 into at least a first gas fraction 164 comprising CO. $CO_2$, $NH_3$, $H_2$, $H_2S$, $C_1$, $C_2$, $C_3$, $C_4$, $C_5$, $C_6$, or combinations thereof; a liquid oil fraction 162; and a water fraction 166, it should be appreciated that additional fractions may also be produced.

In embodiments, the first gas fraction 164 may include from 0.5 wt. % to 3 wt. %, from 0.5 wt. % to 2 wt. %, from 0.5 wt. % to 1.5 wt. %, 0.5 wt. % to 1.2 wt. %, from 0.8 wt. % to 3 wt. %, from 0.8 wt. % to 2 wt. %, from 0.8 wt. % to 1.5 wt. %, from 0.8 wt. % to 1.2 wt. %, or approximately 1 wt. % $H_2$ by weight of the first gas fraction 164.

In embodiments, the first gas fraction 164 may include from 2 wt. % to 50 wt. %, from 2 wt. % to 25 wt. %, from 5 wt. % to 50 wt. %, from 5 wt. % to 25 wt. %, from 5 wt. % to 15 wt. %, from 5 wt. % to 13 wt. %, from 8 wt. % to 50 wt. %, from 8 wt. % to 25 wt. %, from 8 wt. % to 15 wt. %, from 8 wt. % to 13 wt. %, from 10 wt. % to 50 wt. %, from 10 wt. % to 25 wt. %, from 10 wt. % to 15 wt. %, from 10 wt. % to 13 wt. %, from 11 wt. % to 50 wt. %, from 11 wt. % to 25 wt. %, from 11 wt. % to 15 wt. %, from 11 wt. % to 13 wt. %, or approximately 12 wt. % $C_1$ by weight of the first gas fraction 164. In embodiments, the first gas fraction 164 may include from 2 wt. % to 50 wt. %, from 2 wt. % to 25 wt. %, from 5 wt. % to 50 wt. %, from 5 wt. % to 25 wt. %, from 5 wt. % to 15 wt. %, from 5 wt. % to 12 wt. %, from 8 wt. % to 15 wt. %, from 8 wt. % to 12 wt. %, from 10 wt. % to 15 wt. %, from 10 wt. % to 12 wt. %, or approximately 11 wt. % $C_2$ by weight of the first gas fraction 164. In embodiments, the first gas fraction 164 may include from 2 wt. % to 50 wt. %, from 2 wt. % to 25 wt. %, from 2 wt. % to 15 wt. %, from 5 wt. % to 50 wt. %, from 5 wt. % to 25 wt. %, from 5 wt. % to 15 wt. %, from 5 wt. % to 13 wt. %, from 5 wt. % to 11 wt. %, from 7 wt. % to 15 wt. %, from 7 wt. % to 13 wt. %, from 7 wt. % to 11 wt. %, from 9 wt. % to 15 wt. %, from 9 wt. % to 13 wt. %, from 9 wt. % to 11 wt. %, or approximately 10 wt. % $C_3$ by weight of the first gas fraction 164. In embodiments, the first gas fraction 164 may include from 1 wt. % to 50 wt. %, from 1 wt. % to 25 wt. %, from 3 wt. % to 15 wt. %, from 3 wt. % to 12 wt. %, from 3 wt. % to 10 wt. %, from 5 wt. % to 15 wt. %, from 5 wt. % to 12 wt. %, from 5 wt. % to 10 wt. %, from 8 wt. % to 15 wt. %, from 8 wt. % to 12 wt. %, from 8 wt. % to 10 wt. %, or approximately 9 wt. % $C_4$ by weight of the first gas fraction 164. In embodiments, the first gas fraction 164 may include from 0 wt. % to 50 wt. %, from 0 wt. % to 25 wt. %, from 0 wt. % to 10 wt. %, from 0 wt. % to 5 wt. %, from 0 wt. % to 1 wt. %, from 1 wt. % to 15 wt. %, from 1 wt. % to 10 wt. %, from 1 wt. % to 8 wt. %, from 3 wt. % to 10 wt. %, from 3 wt. % to 8 wt. %, from 5 wt. % to 15 wt. %, from 5 wt. % to 12 wt. %, from 5 wt. % to 10 wt. %, from 5 wt. % to 8 wt. %, from 6 wt. % to 10 wt. %, from 6 wt. % to 8 wt. %, or approximately 7 wt. % $C_5$ by weight of the first gas fraction 164. The first gas fraction 164 may include from 0 wt. % to 25 wt. %, from 0 wt. % to 10 wt. %, from 0 wt. % to 1 wt. %, from 1 wt. % to 25 wt. %, from 1 wt. % to 10 wt. %, from 1 wt. % to 7 wt. %, from 1 wt. % to 5 wt. %, from 2 wt. % to 10 wt. %, from 2 wt. % to 7 wt. %, from 2 wt. % to 5 wt. %, from 3 wt. % to 10 wt. %, from 3 wt. % to 7 wt. %, from 3 wt. % to 5 wt. %, or approximately 4 wt. % $C_6$ by weight of the first gas fraction 164. In embodiments, the first gas fraction 164 may include from 0 wt. % to 15 wt. %, from 1 wt. % to 10 wt. %, from 1 wt. % to 5 wt. %, from 1 wt. % to 3 wt. %, or approximately 2 wt. % CO by weight of the first gas fraction 164. In embodiments, the first gas fraction 164 may include from 0 wt. % to 25 wt. %, from 0 wt. % to 10 wt. %, from 0 wt. % to 1 wt. %, from 1 wt. % to 25 wt. %, from 1 wt. % to 10 wt. %, from 1 wt. % to 7 wt. %, from 1 wt. % to 5 wt. %, from 2 wt. % to 10 wt. %, from 2 wt. % to 7 wt. %, from 2 wt. % to 5 wt. %, from 3 wt. % to 10 wt. %, from 3 wt. % to 7 wt. %, from 3 wt. % to 5 wt. %, or approximately 4 wt. % $CO_2$ by weight of the first gas fraction 164. In embodiments, the first gas fraction 164 may include from 1 wt. % to 50 wt. %, from 1 wt. % to 35 wt. %, from 1 wt. % to 30 wt. %, from 1 wt. % to 26 wt. %, from 10 wt. % to 50 wt. %, from 10 wt. % to 35 wt. %, from 10 wt. % to 30 wt. %, from 10 wt. % to 26 wt. %, from 15 wt. % to 50 wt. %, from 15 wt. % to 35 wt. %, from 15 wt. % to 30 wt. %, from 15 wt. % to 26 wt. %, from 20 wt. % to 50 wt. %, from 20 wt. % to 35 wt. %, from 20 wt. % to 30 wt. %, from 20 wt. % to 26 wt. %, from 23 wt. % to 50 wt. %, from 23 wt. % to 35 wt. %, from 23 wt. % to 30 wt. %, from 23 wt. % to 26 wt. %, from 25 wt. % to 50 wt. %, from 25 wt. % to 35 wt. %, from 25 wt. % to 30 wt. %, from 25 wt. % to 26 wt. %, or approximately 25.6 wt. % $H_2S$ by weight of the first gas fraction 164. In embodiments, the first gas fraction 164 may include from 1 wt. % to 50 wt. %, from 1 wt. % to 25 wt. %, from 1 wt. % to 20 wt. %, from 1 wt. % to 15 wt. %, from 5 wt. % to 50 wt. %, from 5 wt. % to 25 wt. %, from 5 wt. % to 20 wt. %, from 5 wt. % to 15 wt. %, from 10 wt. % to 50 wt. %, from 10 wt. % to 25 wt. %, from 10 wt. % to 20 wt. %, from 10 wt. % to 15 wt. %, from 12 wt. % to 50 wt. %, from 12 wt. % to 25 wt. %, from 12 wt. % to 20 wt. %, from 12 wt. % to 15 wt. %, from 14 wt. % to 50 wt. %, from 14 wt. % to 25 wt. %, from 14 wt. % to 20 wt. %, from 14 wt. % to 15 wt. %, or approximately 14.6 wt. % $NH_3$ by weight of the first gas fraction 164. In embodiments, the first gas fraction 164 may include no $C_5$ or $C_6$ components.

In embodiments, the liquid oil fraction 162 may have a $T_5$ true boiling point (TBP) of less than 350° C., of less than 325° C., of less than 300° C., of less than 275° C., or of less than 260° C. In embodiments, the liquid oil fraction 162 may have a $T_5$ TBP of from 25° C. to 350° C., from 25° C. to 325° C., from 25° C. to 300° C., from 25° C. to 275° C., from 25° C. to 250° C., from 25° C. to 225° C., from 25° C. to 200° C. from 25° C. to 175° C., from 25° C. to 150° C., from 25° C. to 125° C. from 25° C. to 100° C., from 25° C. to 75° C., from 25° C. to 50° C., from 50° C. to 350° C., from 50° C. to 325° C., from 50° C. to 300° C., from 50° C. to 275° C., from 50° C. to 250° C., from 50° C. to 225° C., from 50° C. to 200° C., from 50° C. to 175° C., from 50° C. to 150° C., from 50° C. to 125° C. from 50° C. to 100° C., from 50° C. to 75° C., from 75° C. to 350° C., from 75° C. to 325° C., from 75° C. to 300° C. from 75° C. to 275° C. from 75° C. to 250° C., from 75° C. to 225° C., from 75° C. to 200° C., from 75° C. to 175° C. from 75° C. to 150° C., from 75° C. to 125° C., from 75° C. to 100° C., from 100° C. to 350° C., from 100° C. to 325° C., from 100° C. to 300° C. from 100° C. to 275° C. from 100° C. to 250° C., from 100° C. to 225° C., from 100° C. to 200° C., from 100° C. to 175° C., from 100° C. to 150° C., from 100° C. to 125° C., from 125° C. to 350° C., from 125° C. to 325° C. from 125° C. to 300° C., from 125° C. to 275° C., from 125° C. to 250° C., from 125° C. to 225° C. from 125° C. to 200° C., from 125° C. to 175° C. from 125° C. to 150° C., from 150° C. to 350° C., from 150° C. to 325° C. from 150° C. to 300° C., from 150° C. to 275° C. from 150° C. to 250° C. from 150° C. to 225° C., from 150° C. to 200° C. from 150° C. to 175° C. from 175° C. to 350° C. from 175° C. to 325° C., from 175° C. to 300° C., from 175° C. to 275° C., from 175° C. to 250° C. from 175° C. to 225° C., from 175° C. to 200° C., from 200° C. to 350° C., from 200° C. to 325° C. from 200° C. to 300° C., from 200° C. to 275° C., from 200° C. to 250° C., from 200° C. to 225° C., from 225° C. to 350° C., from 225° C. to 325° C., from 225° C. to 300° C., from 225° C. to 275° C., from 225° C. to 250° C., from 250° C. to 350° C., from 250° C. to 325° C., from 250° C. to 300° C., from 250° C. to 275° C., from 275° C. to 350° C., from 275° C. to 325° C., from 275° C. to 300° C., from 300° C. to 350° C., from 300° C. to 325° C., or from 325° C. to 350° C.

The liquid oil fraction 162 may have a $T_{90}$ TBP of less than or equal to 600° C., less than or equal to 575° C., or less than or equal to 550° C. In embodiments, the liquid oil fraction 162 may have a $T_{90}$ TBP from 200° C. to 600° C., from 200° C. to 575° C., from 200° C. to 550° C., from 200° C. to 540° C., from 200° C. to 530° C., from 200° C. to 525° C., from 200° C. to 500° C., from 200° C. to 450° C., from 200° C. to 400° C., from 200° C. to 300° C., from 300° C. to 600° C., from 300° C. to 575° C., from 300° C. to 550° C., from 300° C. to 540° C., from 300° C. to 530° C., from 300° C. to 525° C., from 300° C. to 500° C., from 300° C. to 450° C., from 300° C. to 400° C., from 400° C. to 600° C., from 400° C. to 575° C., from 400° C. to 550° C., from 400° C. to 540° C., from 400° C. to 530° C., from 400° C. to 525° C., from 400° C. to 500° C., from 450° C. to 650° C., from 450° C. to 575° C., from 450° C. to 550° C., from 450° C. to 540° C., from 450° C. to 530° C., from 450° C. to 525° C., from 450° C. to 500° C., from 500° C. to 600° C., from 500° C. to 575° C., from 500° C. to 550° C., from 500° C. to 540° C., from 500° C. to 530° C., from 500° C. to 525° C., from 525° C. to 600° C., from 525° C. to 575° C., from 525° C. to 550° C., from 525° C. to 540° C., from 525° C. to 530° C., from 530° C. to 600° C., from 530° C. to 575° C., from 530° C. to 550° C., from 530° C. to 540° C., from 540° C. to 600° C., from 540° C. to 575° C., from 540° C. to 550° C., from 550° C. to 600° C., from 550° C. to 575° C., or from 575° C. to 600° C., where the $T_{90}$ TBP is greater than the $T_5$ TBP previously described.

The liquid oil fraction 162 may have an API gravity from 12° to 45°, from 12° to 35°, from 12° to 30°, from 12° to 27°, from 12° to 25°, from 15° to 45°, from 15° to 35°, from 15° to 30°, from 15° to 27°, from 15° to 25°, from 18° to 45°, from 18° to 35°, from 18° to 30°, from 18° to 27°, from 18° to 25°, from 20° to 45°, from 20° to 35°, from 20° to 30°, from 20° to 27°, from 20° to 25°, from 21° to 45°, from 21° to 35°, from 21° to 30°, from 21° to 27°, from 21° to 25°, from 23° to 45°, from 23° to 35°, from 23° to 30°, from 23° to 27°, from 23° to 25°, or approximately 24°.

The liquid oil fraction 162 may include less than 3.4 wt. %, less than 2.7 wt. %, or less than 1.0 wt. % total sulfur content by weight of the liquid oil fraction 162. In embodiments, the liquid oil fraction 162 comprises from 0.1 wt. % to 3.4 wt. %, from 0.2 wt. % to 3.4 wt. %, from 0.5 wt. % to 3.4 wt. %, from 0.8 wt. % to 3.4 wt. %, from 1.0 wt. % to 3.4 wt. %, from 1.5 wt. % to 3.4 wt. %, from 2.0 wt. % to 3.4 wt. %, from 2.5 wt. % to 3.4 wt. %, from 3.0 wt. % to 3.4 wt. %, from 0.1 wt. % to 3.0 wt. %, from 0.2 wt. % to 3.0 wt. %, from 0.5 wt. % to 3.0 wt. %, from 0.8 wt. % to 3.0 wt. %, from 1.0 wt. % to 3.0 wt. %, from 1.5 wt. % to 3.0 wt. %, from 2.0 wt. % to 3.0 wt. %, from 2.5 wt. % to 3.0 wt. %, from 0.1 wt. % to 2.5 wt. %, from 0.2 wt. % to 2.5 wt. %, from 0.5 wt. % to 2.5 wt. %, from 0.8 wt. % to 2.5 wt. %, from 1.0 wt. % to 2.5 wt. %, from 1.5 wt. % to 2.5 wt. %, from 2.0 wt. % to 2.5 wt. %, from 0.1 wt. % to 2.0 wt. %, from 0.2 wt. % to 2.0 wt. %, from 0.5 wt. % to 2.0 wt. %, from 0.8 wt. % to 2.0 wt. %, from 1.0 wt. % to 2.0 wt. %, from 1.5 wt. % to 2.0 wt. %, from 0.1 wt. % to 1.5 wt. %, from 0.2 wt. % to 1.5 wt. %, from 0.5 wt. % to 1.5 wt. %, from 0.8 wt. % to 1.5 wt. %, from 1.0 wt. % to 1.5 wt. %, from 0.1 wt. % to 1.0 wt. %, from 0.2 wt. % to 1.0 wt. %, from 0.5 wt. % to 1.0 wt. %, from 0.8 wt. % to 1.0 wt. %, from 0.1 wt. % to 0.8 wt. %, from 0.2 wt. % to 0.8 wt. %, from 0.5 wt. % to 0.8 wt. %, from 0.1 wt. % to 0.5 wt. %, from 0.2 wt. % to 0.5 wt. %, from 0.1 wt. % to 0.2 wt. % total sulfur content by weight of the liquid oil fraction 162.

The liquid oil fraction 162 may include less than 1.2 wt. % or less than 0.9 wt. % total nitrogen content by weight of the liquid oil fraction 162. In embodiments, the liquid oil fraction 162 may include from 0.01 wt. % to 2 wt. %, from 0.01 wt. % to 1.1 wt. %, from 0.01 wt. % to 1.0 wt. %, from 0.01 wt. % to 0.8 wt. %, from 0.01 wt. % to 0.6 wt. %, from 0.01 wt. % to 0.4 wt. %, from 0.01 wt. % to 0.2 wt. %, from 0.01 wt. % to 0.1 wt. %, from 0.1 wt. % to 2 wt. %, from 0.1 wt. % to 1.1 wt. %, from 0.1 wt. % to 1.0 wt. %, from 0.1 wt. % to 0.8 wt. %, from 0.1 wt. % to 0.6 wt. %, from 0.1 wt. % to 0.4 wt. %, from 0.1 wt. % to 0.2 wt. %, from 0.2 wt. % to 2 wt. %, from 0.2 wt. % to 1.1 wt. %, from 0.2 wt. % to 1.0 wt. %, from 0.2 wt. % to 0.8 wt. %, from 0.2 wt. % to 0.6 wt. %, from 0.2 wt. % to 0.4 wt. %, from 0.4 wt. % to 2 wt. %, from 0.4 wt. % to 1.1 wt. %, from 0.4 wt. % to 1.0 wt. %, from 0.4 wt. % to 0.8 wt. %, from 0.4 wt. % to 0.6 wt. %, or approximately 0.3 wt. % total nitrogen content by weight of the liquid oil fraction 162.

The liquid oil fraction 162 may include less than 4.8 wt. % or less than 1.7 wt. % asphaltene (heptane-insoluble) by weight of the liquid oil fraction 162. In embodiments, the liquid oil fraction 162 may include from 0.01 wt. % to 6 wt. %, from 0.01 wt. % to 5 wt. %, from 0.01 wt. % to 4.7 wt. %, from 0.01 wt. % to 4.0 wt. %, from 0.01 wt. % to 3.0 wt. %, from 0.01 wt. % to 2.5 wt. %. from 0.01 wt. % to 2.0 wt. %, from 0.01 wt. % to 1.8 wt. %, from 0.01 wt. % to 1.6 wt. %, from 0.01 wt. % to 1.0 wt. %, from 0.01 wt. % to 0.8 wt. %, from 0.01 wt. % to 0.6 wt. %, from 0.01 wt. % to 0.4 wt. %, from 0.01 wt. % to 0.2 wt. %, from 0.01 wt. % to 0.1 wt. %, from 0.1 wt. % to 6 wt. %, from 0.1 wt. % to 5 wt. %, from 0.1 wt. % to 4.7 wt. %, from 0.1 wt. % to 4.0 wt. %, from 0.1 wt. % to 3.0 wt. %, from 0.1 wt. % to 2.5 wt. %, from 0.1 wt. % to 2.0 wt. %, from 0.1 wt. % to 1.8 wt. %, from 0.1 wt. % to 1.6 wt. %, from 0.1 wt. % to 1.0 wt. %, from 0.1 wt. % to 0.8 wt. %, from 0.1 wt. % to 0.6 wt. %, from 0.1 wt. % to 0.4 wt. %, from 0.1 wt. % to 0.2 wt. %, from 0.2 wt. % to 6 wt. %, from 0.2 wt. % to 5 wt. %, from 0.2 wt. % to 4.7 wt. %, from 0.2 wt. % to 4.0 wt. %, from 0.2 wt. % to 3.0 wt. %, from 0.2 wt. % to 2.5 wt. %, from 0.2 wt. % to 2.0 wt. %, from 0.2 wt. % to 1.8 wt. %, from 0.2 wt. % to 1.6 wt. %, from 0.2 wt. % to 1.0 wt. %, from 0.2 wt. % to 0.8 wt. %, from 0.2 wt. % to 0.6 wt. %, from 0.2 wt. % to 0.4 wt. %, from 0.4 wt. % to 6 wt. %, from 0.4 wt. % to 5 wt. %, from 0.4 wt. % to 4.7 wt. %, from 0.4 wt. % to 4.0 wt. %, from 0.4 wt. % to 3.0 wt. %, from 0.4 wt. % to 2.5 wt. %, from 0.4 wt. % to 2.0 wt. %, from 0.4 wt. % to 1.8 wt. %, from 0.4 wt. % to 1.6 wt. %, from 0.4 wt. % to 1.0 wt. %, from 0.4 wt. % to 0.8 wt. %, from 0.4 wt. % to 0.6 wt. %, or approximately 0.3 wt. % asphaltene (heptane-insoluble) by weight of the liquid oil fraction 162.

The liquid oil fraction 162 may have a viscosity at 50° C. of less than 100 centiStokes (cSt) or less than 50 cSt. In embodiments, the liquid oil fraction 162 may have a viscosity at 50° C. from 10 cSt to 100 cSt, from 20 cSt to 100 cSt, from 30 cSt to 100 cSt, from 40 cSt to 100 cSt, from 50 cSt to 100 cSt, from 60 cSt to 100 cSt, from 70 cSt to 100 cSt, from 80 cSt to 100 cSt, from 90 cSt to 100 cSt, from 10 cSt to 90 cSt, from 20 cSt to 90 cSt, from 30 cSt to 90 cSt, from 40 cSt to 90 cSt, from 50 cSt to 90 cSt, from 60 cSt to 90 cSt, from 70 cSt to 90 cSt, from 80 cSt to 90 cSt, from 10 cSt to 80 cSt, from 20 cSt to 80 cSt, from 30 cSt to 80 cSt, from 40 cSt to 80 cSt, from 50 cSt to 80 cSt, from 60 cSt to 80 cSt, from 70 cSt to 80 cSt, from 10 cSt to 70 cSt, from 20 cSt to 70 cSt, from 30 cSt to 70 cSt, from 40 cSt to 70 cSt, from 50 cSt to 70 cSt, from 60 cSt to 70 cSt, from 10 cSt to 60 cSt, from 20 cSt to 60 cSt, from 30 cSt to 60 cSt, from 40 cSt to 60 cSt, from 50 cSt to 60 cSt, from 10 cSt to 50 cSt, from 20 cSt to 50 cSt, from 30 cSt to 50 cSt, from 40 cSt to 50 cSt, from 10 cSt to 40 cSt, from 20 cSt to 40 cSt, from 30 cSt to 40 cSt, from 10 cSt to 30 cSt, from 20 cSt to 30 cSt, or from 10 cSt to 20 cSt.

As shown in FIG. 1, the first gas fraction 164 may be passed to a gas storage tank 165, the liquid oil fraction 162 may be passed to an oil storage tank 163, and the water fraction 166 may be passed to a water storage tank 167.

After extensive processing time, a thin layer of carbon/coke deposits may accumulate over the surfaces of the catalyst lobular structures 200 as well as over the reactor wall depending on the feedstock type, composition, process severity, and exposure time. Therefore, it may be desirable to remove the deposit layers every two to twelve weeks depending on the deposition rate and targeted acceptable oil conversion level. In order to avoid process interruption, swing type reactors can be used.

Figure 4:
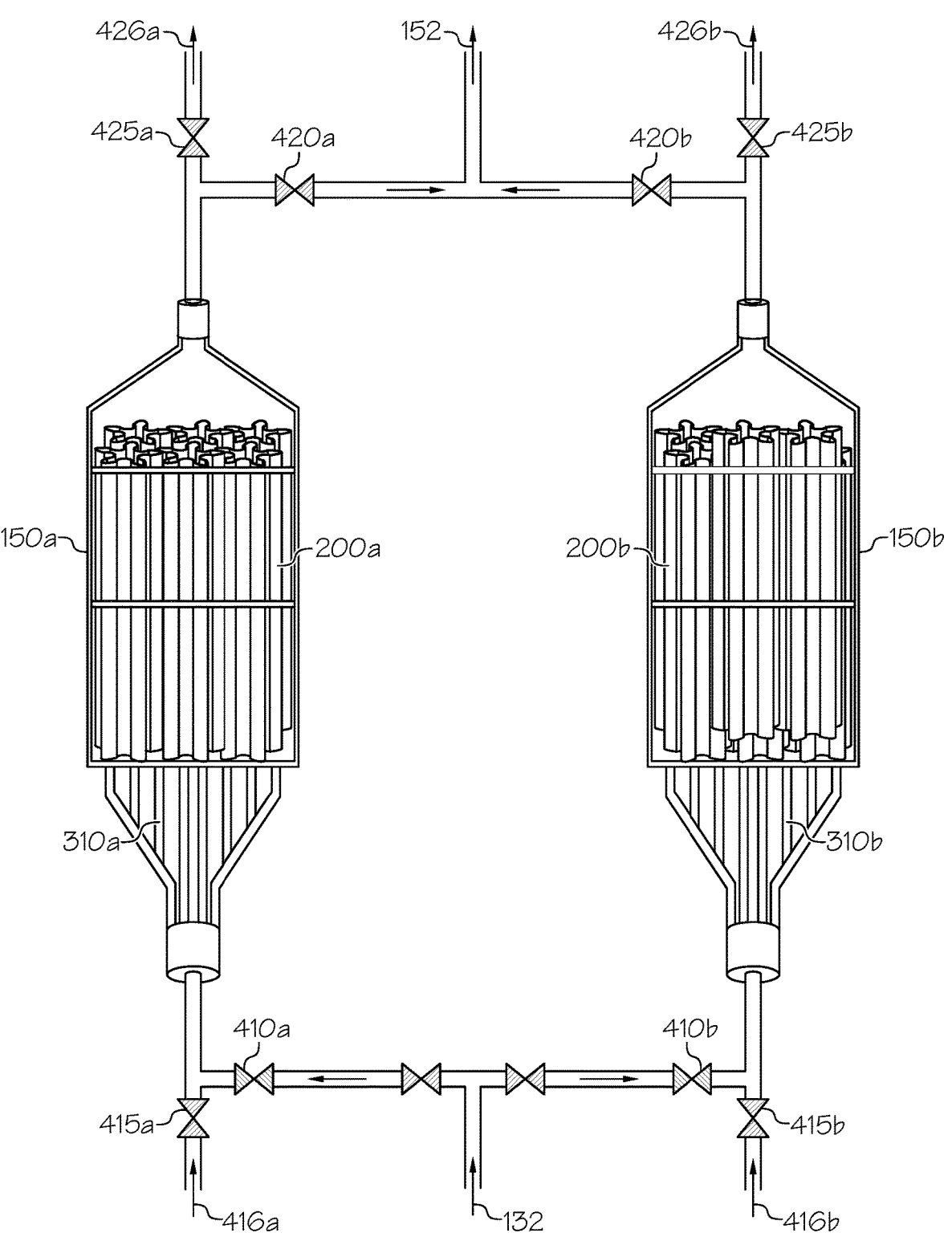
FIG. 4 is a schematic of two supercritical water reactors comprising catalyst lobular structures connected for regeneration according to embodiments disclosed and described herein.
Figure 5:
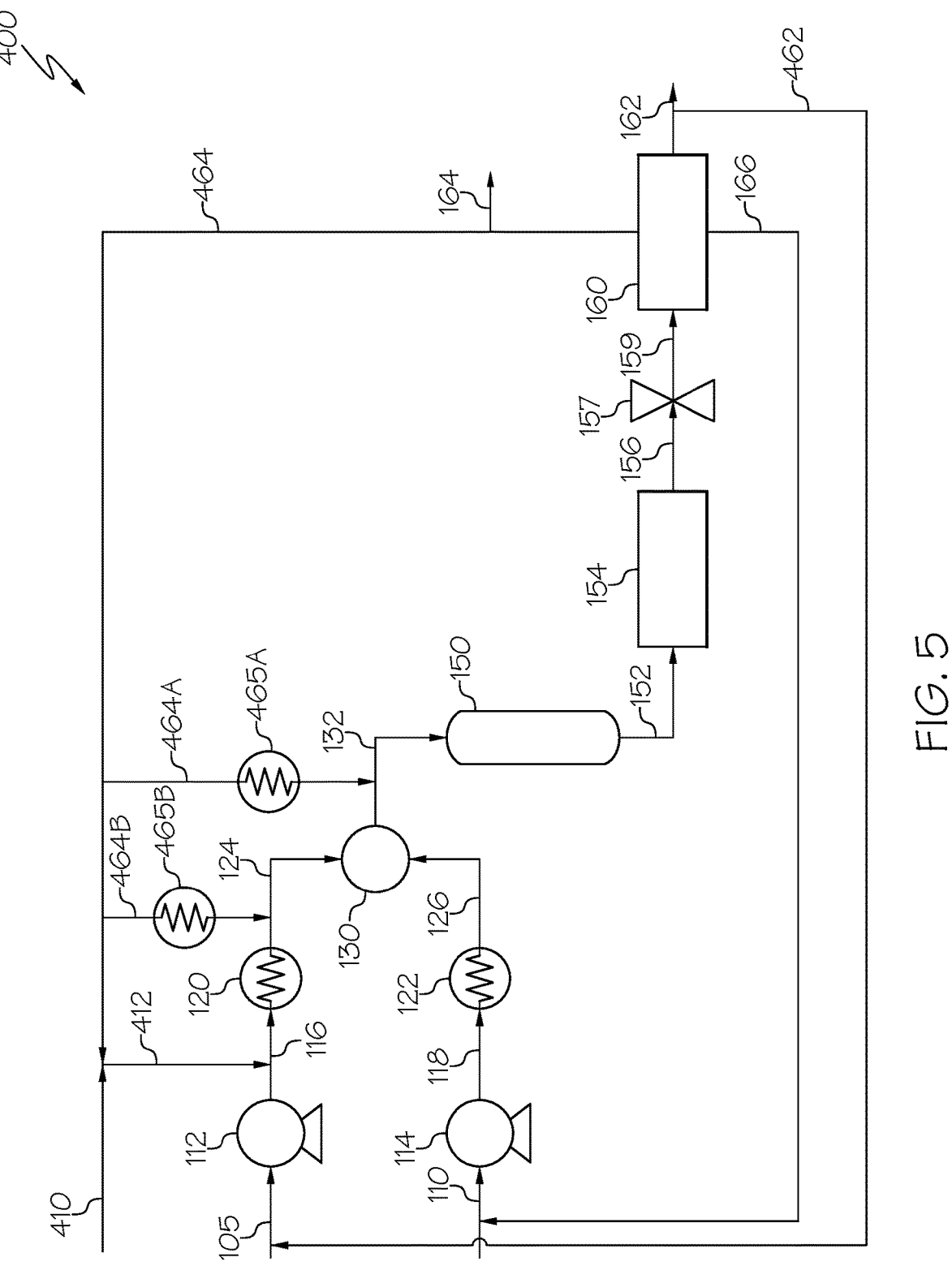
FIG. 5 is a schematic view of a process for upgrading a hydrocarbon-based composition including a hydrogen recycle according to embodiments disclosed and described herein.

With reference now to FIG. 4, when a first supercritical water reactor 150a is being regenerated, a feed stream check valve 410a is closed to restrict the flow of the combined feed stream 132 to the first supercritical water reactor 150a, and an outlet check valve 420a is closed to keep the outlet gas 426a from contaminating the upgraded product 152. Subsequently, regeneration gas check valve 415a is opened to allow regeneration gas 416a into the first supercritical water reactor 150a and outlet stream check valve 425a is opened to allow outlet gas 426a to exit the first supercritical water reactor 150a. Regeneration gas 416a continues to flow into the first supercritical water reactor 150a until the regeneration process is completed. At the same, time feed stream check valve 410b is open to allow the flow of combined feed stream 132 into the second supercritical water reactor 150b, and an outlet check valve 420b is opened to allow upgraded product 152 to flow from the second supercritical water reactor 150b. Regeneration check valve 415b is closed to prevent regeneration gas 416b from entering the second supercritical water reactor 150b, and outlet stream check valve 425b is closed to prevent upgraded product 152 from escaping the second supercritical water reactor 150b.

When a second supercritical water reactor 150b is being regenerated, a feed stream check valve 410b is closed to restrict the flow of the combined feed stream 132 to the second supercritical water reactor 150b, and an outlet check valve 420b is closed to keep the outlet gas 426b from contaminating the upgraded product 152. Subsequently, regeneration gas check valve 415b is opened to allow regeneration gas 416b into the second supercritical water reactor 150b and outlet stream check valve 425b is opened to allow outlet gas 426b to exit the second supercritical water reactor 150b. Regeneration gas 416b continues to flow into the second supercritical water reactor 150b until the regeneration process is completed. At the same time, feed stream check valve 410a is open to allow the flow of combined feed stream 132 into the first supercritical water reactor 150a, and an outlet check valve 420a is opened to allow upgraded product 152 to flow from the first supercritical water reactor 150a. Regeneration check valve 415a is closed to prevent regeneration gas 416a from entering the first supercritical water reactor 150a, and outlet stream check valve 425a is closed to prevent upgraded product 152 from escaping the first supercritical water reactor 150a.

In embodiments, the regeneration gas 416a, 416b may be hot steam (at temperatures greater than 400° C.) that contains oxygen (0.1-1.0 vol. %). The introduction of the regeneration gas 416a, 416b results in chemical reactions between deposits, steam and air to produce CO, $CO_2$ and $H_2$. According to embodiments, the regeneration cycle is completed when the $CO_2$ in the outlet gas 426a, 426b is below 10 mole percent (mol. %) to 15 mol. %. Optimum carbon deposits removal would require between 8 and 12 hours depending on the operating temperature and rate of regeneration gas 416a, 416b.

In one or more embodiments, the supercritical water upgrading process is aided by the addition of hydrogen to convert a greater amount of heavy hydrocarbons into lighter hydrocarbons. The supercritical water upgrading process and the addition of the hydrogen stream have a synergistic effect because the supercritical water dissolves the oil; maximizes mixing of the combined feed stream 132 (oil, water, and hydrogen components); ruptures hydrocarbon and heteroatom chemical bonds; cages asphaltenes and large hydrocarbon radicals (preventing their polymerization); and provides high pressure that brings hydrogen to hydrocarbon and heteroatom radicals' moieties to further rupture chemical bonds and saturate the free hydrocarbon and heteroatom radicals; and the hydrogen addition facilitates rupturing hydrocarbon and heteroatom chemical bonds and saturates the free hydrocarbon and heteroatom radicals generated by the combined effect of supercritical water and the added hydrogen. Specifically, the hydrogen addition may suppress gummy olefin, asphaltene, and coke generation; increase the conversion of the heavy fraction (hydrocarbons having a $T_5$ of greater than 540° C. and/or an API gravity of less than 17°) in the combined feed stream 132 to lighter fractions; allow for increasing operating severity by either increasing temperature or reducing flow rate, thereby increasing the heavy fraction conversion; and provide hydrotreating to the combined feed stream 132 by converting heteroatoms such as sulfur to $H_2S$.

A hydrocarbon upgrading process utilizing hydrogen will now be described with reference to FIG. 4. The hydrocarbon upgrading process 400 includes elements and streams previously described and reference numbers previously used herein refer to the same components as previously described with reference to the hydrocarbon upgrading process 100 depicted in FIG. 1. With reference again to the hydrocarbon upgrading process 400 depicted in FIG. 4, the main difference between this process and the hydrocarbon upgrading process 100 (depicted in FIG. 1) is the addition of fresh hydrogen 410 and recycled hydrogen 464. Three streams exit the gas/oil/water separator 160, a first gas fraction 164, a liquid oil fraction 162, and a water fraction 166. As shown in FIG. 4, unconverted hydrocarbon-based composition 462 is separated from the liquid oil fraction 162 and recycled back into the hydrocarbon upgrading process 400 by combining the unconverted hydrocarbon-based composition 462 with the hydrocarbon-based composition 105. The water fraction 166 is recycled back into the hydrocarbon upgrading process 400 by combining the water fraction 166 with the water stream 110. Hydrogen is removed from the first gas fraction 164 as recycled hydrogen stream 464. According to embodiments, recycled hydrogen stream 464 can be introduced into the hydrocarbon upgrading process 400 by combining all or a portion of the recycled hydrogen stream 464a with the combined feed stream 132 and/or combining all or a portion of the recycled hydrogen stream 464b with the pressurized, heated hydrocarbon-based composition 124 and/or combining all or a portion of the recycled hydrogen stream 464 with a fresh hydrogen stream 410 to form a combined hydrogen stream 412 that is combined with the pressurized hydrocarbon-based composition. Where all or a portion of the recycled hydrogen stream 464a is combined with the combined feed stream 132, the recycled hydrogen stream 464a is heated in heater 465a before combining the recycled hydrogen stream 464a with the combined feed stream 132. Where all or a portion of the recycled hydrogen stream 464b is combined with the pressurized, heated hydrocarbon-based composition 124, the recycled hydrogen stream 464b is heated in heater 465b before combining the recycled hydrogen stream 464b with the pressurized, heated hydrocarbon-based composition.

The fresh hydrogen stream 410 may be any source of hydrogen. According to embodiments, the temperature of recycled hydrogen stream 464a, 4644b is greater than 100° C. after heating in heaters 465a and 465b, respectively. In embodiments, the temperature of recycled hydrocarbon streams 464a, 464b may be from 100° C. to 370° C., from 100° C. to 350° C., from 100° C. to 300° C., from 100° C. to 250° C., from 100° C. to 200° C., from 100° C. to 150° C., from 150° C. to 370° C., from 150° C. to 350° C., from 150° C. to 300° C., from 150° C. to 250° C., from 150° C. to 200° C., from 200° C. to 370° C., from 200° C. to 350° C., from 200° C. to 300° C., from 200° C. to 250° C., from 250° C. to 370° C., from 250° C. to 350° C., from 250° C. to 300° C., from 300° C. to 370° C., from 300° C. to 350° C., or from 350° C. to 370° C. after heating in heaters 465a and 465b, respectively.

Heaters 465a and 465b may include a natural gas fired heater, a heat exchanger, and an electric heater. In embodiments, the hydrogen-to-oil volumetric flow in combined feed stream 132 can be from 10 to 5000 cubic feet of heated hydrogen to one barrel of hydrocarbon-based composition 105, at SATP.

The high pressures present during the catalytic ScW process are exploited by adding hydrogen at 1 wt. % to 1000 wt. % on oil basis, such as at 3 wt. % to 500 wt. %, or at 5 to 100 wt. %, depending on oil type. In addition to rupturing different types of bonds in the oil, catalytic ScW processes facilitates hydrogen transfer and availability in the vicinities of the cracked hydrocarbon and heteroatoms moieties, through severe mixing of hydrogen, water, and oil assisted by the catalyst presence. In addition to hydrothermally generated free hydrocarbon and heteroatoms radicals formed by the ScW process, catalyst and hydrogen addition facilitates hydrocarbon and heteroatoms cracking and saturation reactions, for example converting organic sulfur to $H_2S$, by the effect of the ScW process high temperature and pressures.

As explained hereinabove, hydrogenolysis processes such as hydrocracking requires high hydrogen partial pressure and catalyst to rupture the carbon-sulfur, carbon-carbon, and carbon-metal bonds. In processes disclosed and described herein the catalytic ScW hydrogenation reactions selectively rupture hydrocarbon and heteroatoms bonds and provide the required high pressure for hydrogenation reactions over active catalytic structures surfaces at low hydrogen partial pressure. Under the catalytic ScW hydrogenation process conditions, the relatively lower molecular weight hydrocarbon species of $C_1$ to $C_7$ (paraffins, cycloparaffins, and aromatics) that are less likely to contain organo-sulfur compounds are kinetically more stable than the heavier fractions that contain most of the organo-sulfur species. Therefore, catalytic ScW hydrogenation processes are highly selective towards cracking the oil heavy fractions that contain most of the organo-sulfur species. Furthermore, during upgrading, ScW molecules isolate and separate the heavy molecules by the caging effect, which extends the upgrading reaction at the expense of condensation reactions. In addition, catalyst and hydrogen addition into the ScW process provides additional yields of middle distillate oils but at improved stability by saturating heavy hydrocarbon radicals and olefins that have potential to generate gums. The ScW process also breaks large asphaltenes aggregates having sizes from 1 micron to 800 microns into much smaller scattered radical aggregates having sizes from 1 angstrom to 300 nm and that can readily be approached and saturated by hydrogen due to its small size (1.06 angstroms to 1.20 angstrom). This in turn reduces the asphaltenes content in the oil by converting them into lighter fractions. Therefore, beside desulfurization, catalytic ScW hydrogenation processes facilitate the hydrogenation of heavy hydrocarbon radicals including olefins and asphaltenes radicals and prevents their combination reactions that terminate the upgrading reaction mechanism, which allows for increasing process severity for additional oil upgrading. Large hydrocarbon molecules cracking and radical saturation reactions in catalytic ScW hydrogenation are favored by high operating pressure; therefore, increasing process severity in terms of higher pressures would facilitate large hydrocarbon and heteroatoms bonds rupturing and catalytic hydrogenation of the generated radicals as well as increasing oil conversion. Furthermore, ScW processes have been reported to desulfurize and demetallize hydrocarbon oil. So, adding catalyst and hydrogen to the ScW process will further enhance the sulfur and metals removal by hydrogenating the heteroatoms (hydrotreating+hydrogenolysis). Adding catalyst and hydrogen to ScW process will expand the application of the ScW technology for treating sulfur rich streams besides upgrading by facilitating C—S, H—H, and S—S bond rupturing and hydrogenating the sulfur radicals in ScW to generate di-hydrogen sulfide and light hydrocarbons, as shown by reaction 13.

$$Rm\text{-}S\text{—}R+2H_2 \rightarrow RmH+RH+H_2S \tag{13}$$

Therefore, there exists recognizable synergy between ScW and added catalyst and hydrogen to desulfurize and upgrade hydrocarbon oils.

A first aspect includes a process for upgrading a hydrocarbon-based composition comprising: combining a heated water stream and a pressurized, heated hydrocarbon-based composition in a mixing device to create a combined feed stream; introducing the combined feed stream into a supercritical water reactor operating at a temperature greater than a critical temperature of water and a pressure greater than a critical pressure of water; and at least partially converting the combined feed stream to an upgraded product, wherein at least one catalyst lobular structure is present in the supercritical water reactor.

A second aspect includes a process according to the first aspect, wherein hydrogen is mixed with the heated water stream and the pressurized, heated hydrocarbon-based composition in the mixing device to create the combined feed stream.

A third aspect includes a process according to any one of the first aspect or the second aspect, wherein a plurality of catalyst lobular structures are present in the supercritical water reactor.

A fourth aspect includes a process according to any of the preceding aspects, wherein the at least one catalyst lobular structure is an unsupported catalyst lobular structure.

A fifth aspect includes a process according to any of the preceding aspects, wherein the at least one catalyst lobular structure comprises a transition metal.

A sixth aspect includes a process according to any of the preceding aspects, wherein the at least one catalyst lobular structure comprises a transition metal selected from Group 3 to Group 12 transition metals.

A seventh aspect includes a process according to any of the preceding aspects, wherein the at least one catalyst lobular structure comprises a metal selected from the group consisting of Fe, Ni, Pt, Mo, Cr, Zn and combinations thereof.

An eighth aspect includes a process according to any of the preceding aspects, wherein the at least one catalyst lobular structure comprises an additive selected from the group consisting of aluminum, silicon, boron, gallium, indium, bismuth, and combinations thereof.

A ninth aspect includes a process according to any of the preceding aspects, wherein a height of the at least one catalyst lobular structure is at least 25% of the height of the supercritical water reactor.

A tenth aspect includes a process according to any of the preceding aspects, wherein the at least one catalyst lobular structure has at least 5 lobes.

An eleventh aspect includes a process according to any of the preceding aspects, further comprising passing the upgraded product out of the supercritical water reactor to a gas/oil/water separator and separating the upgraded product in the gas/oil/water separator to produce a gas fraction, a liquid oil fraction, and a water fraction.

A twelfth aspect includes a process according to the eleventh aspect, wherein the gas fraction comprises hydrogen, and the hydrogen is recycled and mixed to be part of the combined feed stream.

A thirteenth aspect includes a process according to any of the preceding aspects, further comprising passing the upgraded product to a cooling device to form a cooled upgraded product.

A fourteenth aspect includes a process according to the thirteenth aspect, further comprising passing the cooled upgraded product to a depressurizing device.

A fifteenth aspect includes a process according to any of the thirteenth or fourteenth aspects, further comprising depressurizing the cooled upgraded product to less than 1 MPa.

A sixteenth aspect includes a process according to any of the preceding aspects, wherein the pressurized, heated hydrocarbon-based composition has a temperature from 100° C. to 370° C.

A seventeenth aspect includes a process according to any of the preceding aspects, wherein the supercritical water reactor has a temperature of greater than 375° C. and less than 600° C. and a pressure greater than 22.1 MPa and less than 75 MPa.

A eighteenth aspect includes a process according to any of the preceding aspects, wherein the supercritical water reactor has a temperature of greater than 390° C. and less than 470° C. and a pressure greater than 24 MPa and less than 30 MPa.

A nineteenth aspect includes a process according to any of the preceding aspects, wherein the supercritical water reactor has a residence time of from 1 to 30 minutes.

A twentieth aspect includes a process according to any of the preceding aspects, wherein the supercritical water reactor has a residence time of from 2 to 15 minutes.

EXAMPLES

Example 1

An example process for upgrading a hydrocarbon-based composition 105 according to embodiments described herein was run. A hydrocarbon-based composition was treated with Catalytic ScW hydrogenation process where water and the hydrocarbon-based composition are injected at a ratio of 1:1 and hydrogen was injected at a rate that is 30 wt. % on oil basis. The operating conditions in the ScW reactor were 420° C. and 28.0 MPa. The make-up of the hydrocarbon-based composition and liquid oil fraction are shown in Tables 1 and 2 on dry basis:

The hydrocarbon-based composition 105 had the properties shown in Table 1.

TABLE 1

| Properties of hydrocarbon-based composition and liquid oil fraction | | |
| --- | --- | --- |
| Properties | Hydrocarbon-based composition (105) | Liquid Oil Fraction (162) |
| Mass Flow (kg/hr) | 50.0 | 47.0 |
| API° | 11 | 27 |
| Hydrogen Flow (kg/hr) (30% on Oil basis) | 15.0 | 0.0 |
| Distillation(TBP) 5% | 367 | 239 |
| 10% | 395 | 283 |
| 30% | 465 | 357 |
| 50% | 526 | 398 |
| 70% | 587 | 444 |
| 90% | 647 | 521 |
| 95% | 671 | 551 |
| Total Sulfur Content (wt. %) | 3.4 | 0.52 |
| Total Nitrogen Content (wt. %) | 1.2 | 0.1 |
| Viscosity (cSt) at 50° C. | 640 | 22 |
| Asphaltenes (Heptane-insoluble) (wt. %) | 4.8 | 0.1 |
| Metals (V and Ni) (ppm) | 83 | 2 |

The process also produces a gas fraction having the composition shown in Table 2:

TABLE 2

| Gas Fraction composition | | |
| --- | --- | --- |
| Species | Concentration (wt. %) | kg/hr |
| $H_2$ | 3.0 | 0.54 |
| $CH_4$ | 16.4 | 2.95 |
| $C_2H_6$ | 15.2 | 2.74 |
| $C_3H_8$ | 15.0 | 2.70 |
| $C_4H_{10}$ | 14.0 | 2.52 |
| $C_5H_{12}$ | 11.0 | 1.98 |
| $C_6H_{14}$ | 9.0 | 1.62 |
| CO | 2.0 | 0.36 |
| $CO_2$ | 2.0 | 0.36 |
| $H_2S$ | 8.7 | 1.56 |
| $NH_3$ | 3.7 | 0.67 |

Example 2

A process was conducted using non-catalytic ScW and using catalytic ScW. The results are shown in Table 3 below:

TABLE 3

Non-Catalytic vs. Catalytic ScW Processes

| Property | Non-Catalytic | Catalytic |
|---|---|---|
| Percent sulfur in the liquid product | 45 | 14 |
| Percent nitrogen in the liquid product | 23 | 8 |
| Percent NH$_3$ generated relevant to nitrogen fed | 93 | 112 |
| Percent H$_2$S generated relevant to sulfur fed | 58 | 92 |
| Percent liquid product yield | 93 | 94 |
| Percent conversion of 540° C.+ hydrocarbons | 80 | 86 |
| Percent desulfurization | 55 | 86 |
| Percent denitrogenation | 77 | 92 |

Oil upgrading by catalytic hydrogenative ScW processes combines the benefits of operating at lower cost than severe deep hydrotreating and hydrogenolysis processes while producing more stable products than thermal cracking processes or ScW processes without catalyst and hydrogen utilization. Through adding catalyst and hydrogen embodiments disclosed and described herein increase product yield of ScW processes while providing additional treatment of the oil by exploiting ScW process high pressures by saturating the generated free heteroatoms radicals that can be easily removed from the product such as converting sulfur to H$_2$S. Furthermore, hydrogen and catalyst addition to ScW processes passivates the combination reactions of large hydrocarbon radicals and olefins that are hydrothermally generated by ScW, thereby preventing gums, asphaltenes, and coke generation, which allows for increasing process severity for additional oil treatment. Adding hydrogen and catalyst to ScW process expands the application of the ScW technology for treating more difficult feedstocks that are not possible to be treating the non-catalytic and hydrogenative ScW process.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents.

As used throughout the disclosure, the singular forms "a," "an" and "the" include plural referents unless the context clearly dictates otherwise. Thus, for example, reference to "a" component includes aspects having two or more such components, unless the context clearly indicates otherwise.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A process for upgrading a hydrocarbon-based composition comprising:

combining a heated water stream and a pressurized, heated hydrocarbon-based composition in a mixing device to create a combined feed stream;

introducing the combined feed stream into a supercritical water reactor operating at a temperature greater than a critical temperature of water and a pressure greater than a critical pressure of water; and at least partially converting the combined feed stream to an upgraded product, wherein at least one catalyst lobular structure comprising a non-porous metal is present in the supercritical water reactor.

2. The process of claim 1, wherein hydrogen is mixed with the heated water stream and the pressurized, heated hydrocarbon-based composition in the mixing device to create the combined feed stream.

3. The process of claim 1, wherein a plurality of catalyst lobular structures are present in the supercritical water reactor.

4. The process of claim 1, wherein the at least one catalyst lobular structure is an unsupported catalyst lobular structure.

5. The process of claim 1, wherein the at least one catalyst lobular structure comprises a transition metal.

6. The process of claim 1, wherein the at least one catalyst lobular structure comprises a transition metal selected from Group 3 to Group 12 transition metals.

7. The process of claim 1, wherein the at least one catalyst lobular structure comprises a metal selected from the group consisting of Fe, Ni, Pt, Mo, Cr, Zn and combinations thereof.

8. A process for upgrading a hydrocarbon-based composition comprising:

combining a heated water stream and a pressurized, heated hydrocarbon-based composition in a mixing device to create a combined feed stream;

introducing the combined feed stream into a supercritical water reactor operating at a temperature greater than a critical temperature of water and a pressure greater than a critical pressure of water; and at least partially converting the combined feed stream to an upgraded product, wherein at least one catalyst lobular structure is present in the supercritical water reactor, the at least one catalyst lobular structure comprises a metal selected from the group consisting of Fe, Ni, Pt, Mo, Cr, Zn and combinations thereof, and an additive selected from the group consisting of aluminum, silicon, boron, gallium, indium, bismuth, and combinations thereof.

9. The process of claim 1, wherein a height of the at least one catalyst lobular structure is at least 25% of the height of the supercritical water reactor.

10. The process of claim 1, wherein the at least one catalyst lobular structure has at least 5 lobes.

11. The process of claim 1, further comprising passing the upgraded product out of the supercritical water reactor to a gas/oil/water separator and separating the upgraded product in the gas/oil/water separator to produce a gas fraction, a liquid oil fraction, and a water fraction.

12. A process for upgrading a hydrocarbon-based composition comprising:

combining a heated water stream and a pressurized, heated hydrocarbon-based composition in a mixing device to create a combined feed stream;

introducing the combined feed stream into a supercritical water reactor operating at a temperature greater than a critical temperature of water and a pressure greater than a critical pressure of water;

at least partially converting the combined feed stream to an upgraded product; and passing the upgraded product out of the supercritical water reactor to a gas/oil/water separator and separating the upgraded product in the gas/oil/water separator to produce a gas fraction, a liquid oil fraction, and a water fraction, wherein the gas fraction comprises hydrogen, and the hydrogen is recycled and mixed to be part of the combined feed stream, and at least one catalyst lobular structure is present in the supercritical water reactor.

13. The process of claim 1, further comprising passing the upgraded product to a cooling device to form a cooled upgraded product.

14. The process of claim 13, further comprising passing the cooled upgraded product to a depressurizing device.

15. The process of claim 14, further comprising depressurizing the cooled upgraded product to less than 1 MPa.

16. The process of claim 1, wherein the pressurized, heated hydrocarbon-based composition has a temperature from 100° C. to 370° C.

17. The process of claim 1, wherein the supercritical water reactor has a temperature of greater than 375° C. and less than 600° C. and a pressure greater than 22.1 MPa and less than 75 MPa.

18. The process of claim 1, wherein the supercritical water reactor has a temperature of greater than 390° C. and less than 470° C. and a pressure greater than 24 MPa and less than 30 MPa.

19. The process of claim 1, wherein the supercritical water reactor has a residence time of from 1 to 30 minutes.

20. The process of claim 1, wherein the supercritical water reactor has a residence time of from 2 to 15 minutes.

* * * * *